(12) United States Patent
Saida et al.

(10) Patent No.: US 10,091,841 B2
(45) Date of Patent: Oct. 2, 2018

(54) MICROWAVE DEVICE AND FLOW TUBE USED THEREIN

(75) Inventors: Hisato Saida, Yaizu (JP); Hiromichi Odajima, Yaizu (JP); Noriyuki Ohneda, Yaizu (JP); Saori Yokozawa, Yaizu (JP)

(73) Assignee: PACIFIC MICROWAVE TECHNOLOGY CORP., Los Altos, CA (US)

( * ) Notice: Subject to any disclaimer, the term of this patent is extended or adjusted under 35 U.S.C. 154(b) by 661 days.

(21) Appl. No.: 13/876,584

(22) PCT Filed: Sep. 29, 2011

(86) PCT No.: PCT/JP2011/072443
§ 371 (c)(1),
(2), (4) Date: Mar. 28, 2013

(87) PCT Pub. No.: WO2012/043753
PCT Pub. Date: Apr. 5, 2012

(65) Prior Publication Data
US 2013/0233849 A1    Sep. 12, 2013

(30) Foreign Application Priority Data

Sep. 30, 2010  (JP) ................................. 2010-221567
Aug. 8, 2011   (JP) ................................. 2011-172926

(51) Int. Cl.
*H05B 6/64*    (2006.01)
*B01J 19/12*   (2006.01)
(Continued)

(52) U.S. Cl.
CPC .......... *H05B 6/6402* (2013.01); *B01J 19/126* (2013.01); *H05B 6/806* (2013.01);
(Continued)

(58) Field of Classification Search
CPC .............. B01J 19/126; B01J 2219/0087; B01J 2219/1215; B01J 2219/1281; B01J 2219/1293; H05B 6/6402; H05B 6/806
(Continued)

(56) References Cited

U.S. PATENT DOCUMENTS 3,794,801 A * 2/1974 Long ....................... H05B 6/804
                                                  180/304
4,221,948 A * 9/1980 Jean ....................... B01J 19/126
                                                  219/697
(Continued)

FOREIGN PATENT DOCUMENTS

JP        6-501335 A        2/1994
JP     2000-501880 A        2/2000
(Continued)

OTHER PUBLICATIONS

*Ex parte Rodriguez*; BPAI Appeal 2008-000693; Oct. 1, 2009.*
Japanese Office Action, dated Jul. 8, 2014, 3 pages.

*Primary Examiner* — David Angwin
*Assistant Examiner* — John J Norton
(74) *Attorney, Agent, or Firm* — Foley & Lardner LLP

(57) ABSTRACT

A microwave device includes a microwave generator generating a microwave and outputting the microwave, a waveguide guiding the microwave output from the microwave generator, a cavity resonator, and a flow tube. In some embodiments, the cavity resonator has an irradiation chamber as a quadrangular prism cavity into which the microwave guided by the waveguide is introduced, resonates the microwave in the irradiation chamber, and generates an electric field in TM110 mode along a direction of a center axis through centers of top and bottom faces of the irradiation chamber. The flow tube is installed in the irradiation chamber and formed in a helical fashion by winding and extending around the center axis, and causes a liquid to be
(Continued)

treated to flow in a direction crossing the electric field generated in the irradiation chamber. The center axis is a location where the electric field is the strongest in the irradiation chamber.

<div style="text-align:center">3 Claims, 23 Drawing Sheets</div>

(51) Int. Cl.
  *H05B 6/80* (2006.01)
  *C02F 1/30* (2006.01)
(52) U.S. Cl.
  CPC .............. *B01J 2219/0877* (2013.01); *B01J 2219/0892* (2013.01); *B01J 2219/126* (2013.01); *B01J 2219/1215* (2013.01); *B01J 2219/1227* (2013.01); *B01J 2219/1275* (2013.01); *B01J 2219/1281* (2013.01); *B01J 2219/1284* (2013.01); *B01J 2219/1293* (2013.01); *C02F 1/302* (2013.01)
(58) Field of Classification Search
  USPC .......................... 219/756, 687, 688
  See application file for complete search history.

(56) References Cited

U.S. PATENT DOCUMENTS

| | | | | |
|---|---|---|---|---|
| 4,417,116 A | * | 11/1983 | Black | H05B 6/804 219/688 |
| 4,753,675 A | * | 6/1988 | Ovshinsky | B01J 19/126 148/105 |
| 4,956,534 A | * | 9/1990 | Martin | H05B 6/804 165/184 |
| 5,206,471 A | * | 4/1993 | Smith | C23C 16/452 118/620 |
| 5,270,515 A | * | 12/1993 | Long | B01J 19/126 110/243 |
| 2003/0071224 A1 | * | 4/2003 | Hallett | A61L 2/10 250/432 R |
| 2005/0034972 A1 | * | 2/2005 | Lautenschlager | B01F 7/008 204/157.43 |
| 2010/0206872 A1 | * | 8/2010 | Matsuzawa | H05B 6/806 219/687 |
| 2010/0308036 A1 | * | 12/2010 | Tomita | H05B 6/6408 219/756 |

FOREIGN PATENT DOCUMENTS

| | | | | |
|---|---|---|---|---|
| JP | 2004-313104 A | | 11/2004 | |
| JP | 2005-322582 A | | 11/2005 | |
| JP | 2006-272055 A | | 10/2006 | |
| JP | 2007-000774 A | | 1/2007 | |
| JP | 2007-222696 A | | 9/2007 | |
| JP | 2008-247667 A | | 10/2008 | |
| JP | 2008247667 A | * | 10/2008 | |
| JP | 2009-80997 A | | 4/2009 | |
| JP | 2009146650 A | * | 7/2009 | ........... H05B 6/6408 |
| JP | 2010-131590 A | | 6/2010 | |
| JP | 2010-207735 A | | 9/2010 | |
| JP | 2010207735 A | * | 9/2010 | |

\* cited by examiner

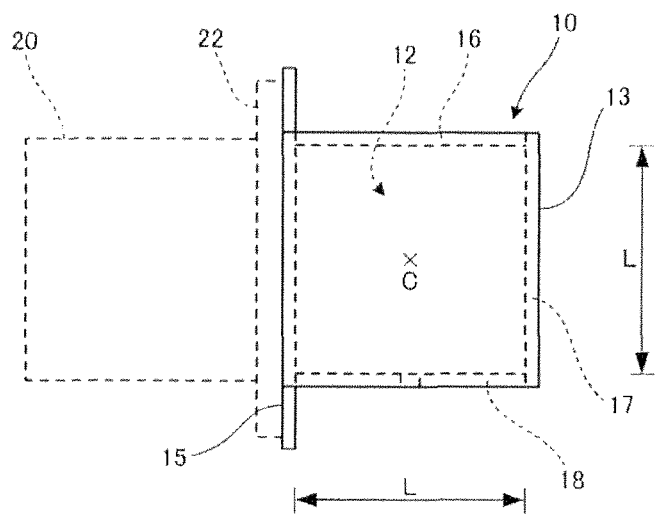
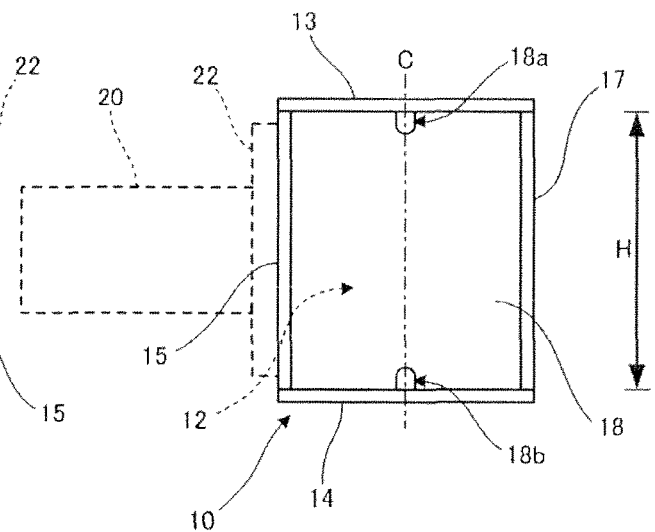
FIG. 2C
FIG. 2B        FIG. 2A

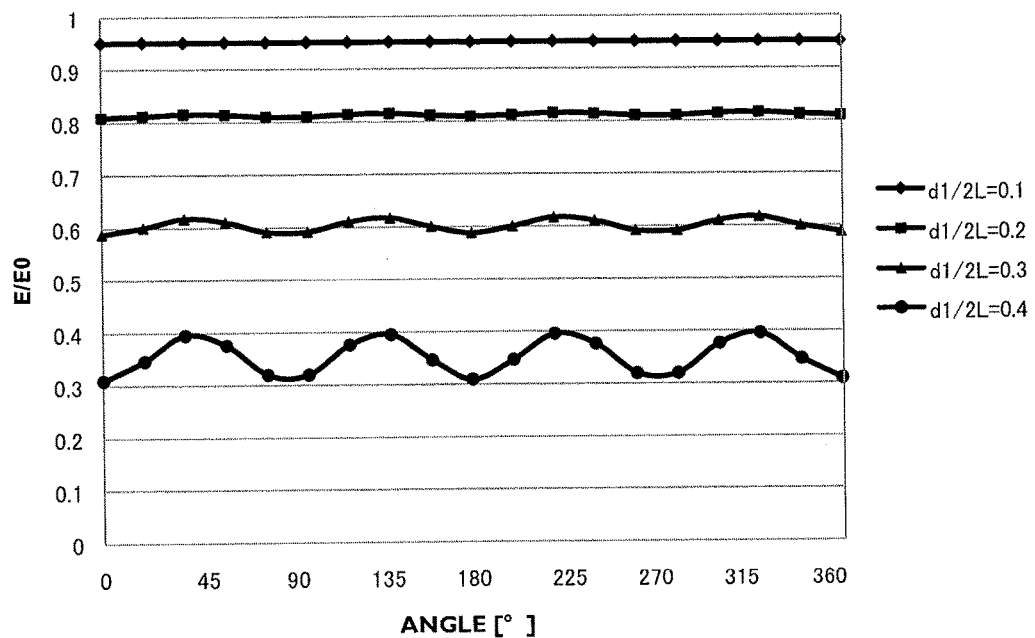
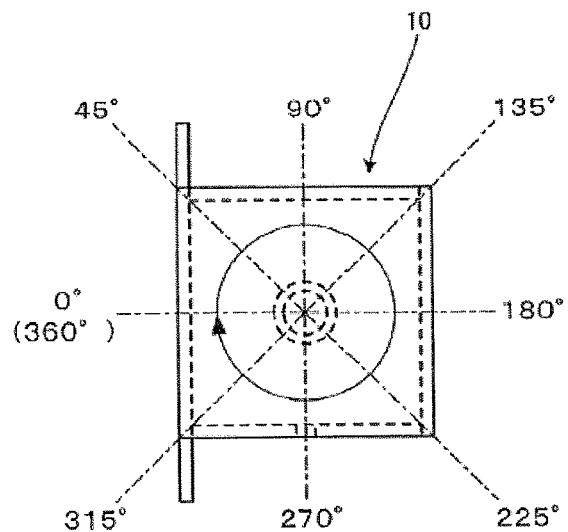
FIG. 8

FIG. 18A

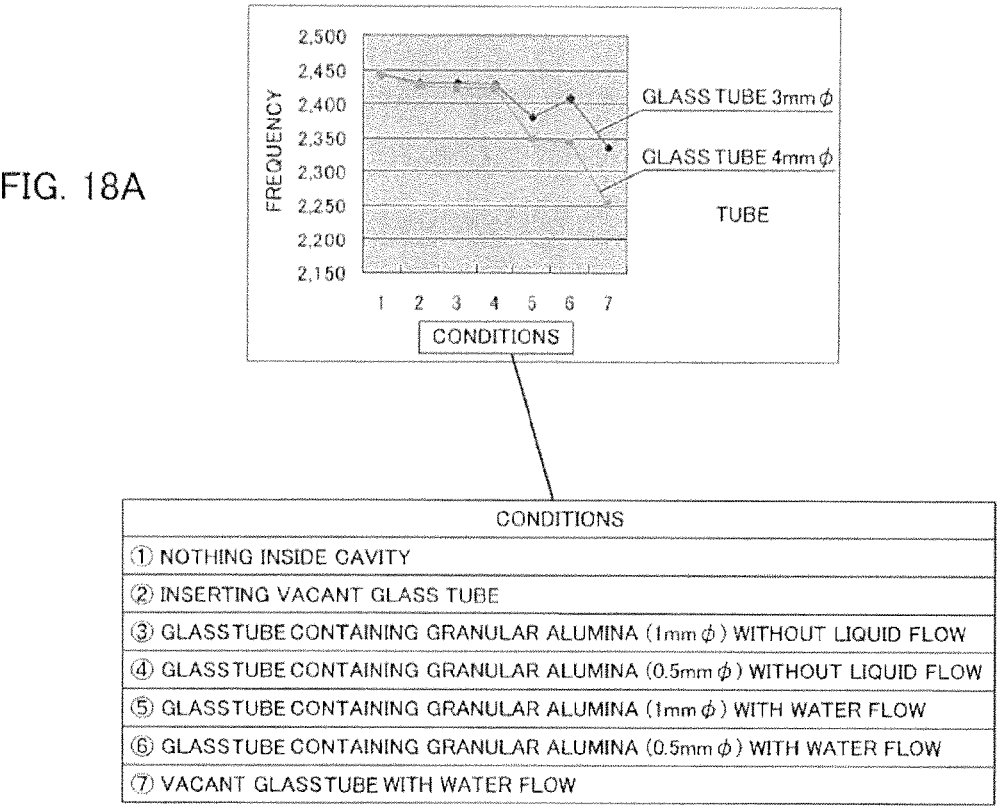

| CONDITIONS |
|---|
| ① NOTHING INSIDE CAVITY |
| ② INSERTING VACANT GLASS TUBE |
| ③ GLASS TUBE CONTAINING GRANULAR ALUMINA (1mm φ) WITHOUT LIQUID FLOW |
| ④ GLASS TUBE CONTAINING GRANULAR ALUMINA (0.5mm φ) WITHOUT LIQUID FLOW |
| ⑤ GLASS TUBE CONTAINING GRANULAR ALUMINA (1mm φ) WITH WATER FLOW |
| ⑥ GLASS TUBE CONTAINING GRANULAR ALUMINA (0.5mm φ) WITH WATER FLOW |
| ⑦ VACANT GLASS TUBE WITH WATER FLOW |

FIG. 18B

| LIQUID TO BE TREATED | COMPLEX RELATIVE DIELECTRIC CONSTANT | | Q | | |
|---|---|---|---|---|---|
| | $\varepsilon r'$ | $\varepsilon r''$ | INSIDE DIAMETER | | |
| | | | 1mm | 1.5mm | 2mm |
| WATER | 80 | 10 | 245 | 113 | 67 |
| ETHANOL | 24.3 | 22.9 | 104 | 47 | 27 |
| METHANOL | 32.6 | 21.4 | 112 | 51 | 29 |
| ETHYLENE GLYCOL | 37 | 50 | 48 | 22 | 13 |
| DMF | 37.7 | 6.07 | 396 | 180 | 104 | ue
MICROWAVE DEVICE AND FLOW TUBE USED THEREIN

TECHNICAL FIELD

The present invention relates to an apparatus that treats a substance by irradiating a microwave to heat it or accelerate a chemical reaction thereof, etc.

BACKGROUND ART

In recent years, the fact that a microwave accelerates a chemical reaction was found and interest in a chemical reactor using a microwave is increasing in fields such as biochemistry. A batch processing device, for example, a kind of kitchen type microwave oven, is currently mainstream device in such a microwave apparatus for accelerating a chemical reaction or heating, the batch processing device performs a treatment by using a test tube or a flask containing a liquid to be treated. However, the batch processing device is limited in throughput capacity and thus, a flow type device in which a flow channel is formed and irradiated with a microwave while a liquid to be treated flows therethrough is under study (see Patent Document 1).

CITATION LIST

Patent Document

Patent Document 1: Japanese Laid-open (Kokai) Patent Application Publication No. 2006-272055

DISCLOSURE OF THE INVENTION

Problems to be Solved by the Invention

A microwave device disclosed in Patent Document 1 has a flow channel disposed in a rectangular waveguide. However, absorption efficiency of a microwave by a liquid to be treated is improved when a cavity resonator is used, resulting in more efficient treatment. In particular, if a device has a flow channel formed in a single-mode cavity resonator, the device has superior reproducibility of a reaction and also the treatment time can be reduced because an electromagnetic field generated in the cavity resonator during resonance is strong. However, for a microwave device using a cavity resonator, the mechanism to synchronize the cavity resonator and a microwave is said to be difficult.

In a single-mode cavity resonator, it is deemed that a liquid to be treated absorbs too much microwave due to a strong electromagnetic field, so that difficulty of the synchronization is caused. That is, energy absorbed by a liquid to be treated per unit time is too large with respect to microwave energy accumulated in the cavity resonator and "Q" of resonance defined by a formula multiplying a ratio of these two quantities (the microwave energy/the energy per unit time) by an angular frequency becomes smaller. If Q becomes smaller, not only strengths as a resonator are lost, but also it becomes difficult to synchronize a resonance frequency, which is needed to maintain resonance.

Currently, steps such as making the cross section of the flow channel as small as possible and reducing the volume of a liquid to be treated present in the cavity resonator to a minimum when compared with the cavity volume to reduce energy per unit time absorbed by the liquid to be treated are taken to overcome problems. That is, the diameter of a flow channel, which is generally a cylindrical straight tube, is made extremely small to reduce a liquid volume per unit time of the liquid to be treated flowing through the flow channel, i.e., the volume of the liquid to be treated present in the cavity resonator. To maintain Q at a suitable value with the above steps, the flow channel is forced to have a small diameter of 1.0 mm or less for a cavity resonator operating at a frequency of 2,450 MHz of microwave, which is currently common. However, such a small diameter may not be considered to have sufficient throughput capacity for commercialization.

In view of the above background, an object of the present invention is to enable a microwave device using a single-mode cavity resonator to uniformly and efficiently treat a liquid to be treated by increasing a flow rate thereof.

Solution to Problem

A microwave device according to a first aspect of the present invention includes a single-mode cavity resonator having an irradiation chamber as a quadrangular prism cavity or a cylindrical cavity, a flow tube installed in the irradiation chamber whose axis line is substantially aligned in a direction of an electric field generated in the irradiation chamber, and an obstacle having a different dielectric constant from the dielectric constant of a liquid to be treated flowing through the flow tube and contained in the flow tube to disturb a flow of the liquid to be treated.

A microwave device according to a second aspect of the present invention includes a single-mode cavity resonator having an irradiation chamber as a quadrangular prism cavity or a cylindrical cavity, and a flow tube installed in the irradiation chamber, the flow tube is formed in a helical fashion by winding and extending around a center axis through centers of top and bottom faces of the irradiation chamber.

A flow tube according to a third aspect of the present invention can be used in a microwave device including a single-mode cavity resonator having an irradiation chamber as a quadrangular prism cavity or a cylindrical cavity, in which the flow tube includes an obstacle that has a different dielectric constant from the dielectric constant of a liquid to be treated flowing through the flow tube and disturbs a flow of the liquid to be treated, and in which the flow tube is installed in the irradiation chamber with substantially aligning an axis line thereof with a direction of an electric field generated in the irradiation chamber.

A flow tube according to a fourth aspect of the present invention can be used in a microwave device including a single-mode cavity resonator having an irradiation chamber as a quadrangular prism cavity or a cylindrical cavity, in which when installed in the irradiation chamber, the flow tube is formed in a helical fashion by winding and extending around a center axis through centers of top and bottom faces of the irradiation chamber.

Advantageous Effects of the Invention

A flow tube according to an aspect of the present invention includes an obstacle which has a dielectric constant differing from that of a liquid to be treated and disturbs the flow of the liquid to be treated. If the flow tube is installed in an irradiation chamber (resonant cavity) of a microwave device, since the distribution of an electric field in the flow tube through which the liquid to be treated flows becomes non-uniform, so that an average strength of the electric field is reduced. Accordingly, the absorption of a microwave by the liquid to be treated is inhibited. As a result, even if the volume of the liquid to be treated present in an irradiation chamber is enlarged by making the diameter of the flow tube larger, the rate of reduction of the resonance frequency is inhibited. Therefore, it can be easily achieved to maintain the resonance frequency for various kinds of liquid to be treated within a predetermined band, for example, the Industry-Science-Medical (ISM) band. In addition, since a decrease of Q is inhibited, a synchronization can be easily made, so that treatment efficiency can be improved by increasing the volume of the liquid to be treated present in the irradiation chamber.

Regarding a microwave device in another aspect of the present invention, in an irradiation chamber (resonant cavity) of a cavity resonator thereof, an electric field is generated in parallel to a center axis of the irradiation chamber. A flow tube in the irradiation chamber is provided in a helical fashion winding around the center axis of the irradiation chamber and thus, a liquid to be treated flowing through the flow tube flows in a direction crossing the electric field. With this structure, a boundary of the liquid to be treated, that is, a dielectric material is aligned in a direction crossing the electric field and thus, energy absorbed by the liquid to be treated per unit time is reduced and decrease in Q is inhibited. Therefore, even if the flow rate of the liquid to be treated is increased by using a larger diameter flow tube than in the conventional case, the decrease in Q becomes significantly mild and Q can be kept at an appropriate value. By adopting the flow tube in a helical fashion, when compared with a straight flow tube, the flowing distance of the liquid to be treated in the irradiation chamber is elongated, and hence the residence time in the irradiation chamber can be gained while the strength of a microwave received by the liquid to be treated being maintained constant. As a result of the foregoing, uniform and efficient treatment by a single-mode cavity resonator can be achieved.

BRIEF DESCRIPTION OF THE DRAWINGS

FIG. 2 illustrates a first embodiment of a cavity resonator, in which FIG. 2A is a front view when viewed from the same side as FIG. 1, FIG. 2B is a left side view, and FIG. 2C is a plane view;

FIG. 3 illustrates a flow tube arrangement state in the cavity resonator in FIG. 2, in which

FIG. 6 illustrates a jig for the flow tube and a support rod, in which

FIG. 7 illustrates a second embodiment of the cavity resonator, in which

FIG. 8 illustrates simulation results of electric field changes in a circumferential direction around a center axis of the cavity resonator, regarding an electric field in the cavity resonator according to the first embodiment;

FIG. 13 illustrates a third embodiment of the cavity resonator, in which

FIG. 14 illustrates a fourth embodiment of the cavity resonator, in which

FIG. 18 illustrates experimental results of the flow tube according to the first embodiment;

DESCRIPTION OF EMBODIMENTS

Various embodiments of the present invention will be described below with reference to drawings.

Figure 1:
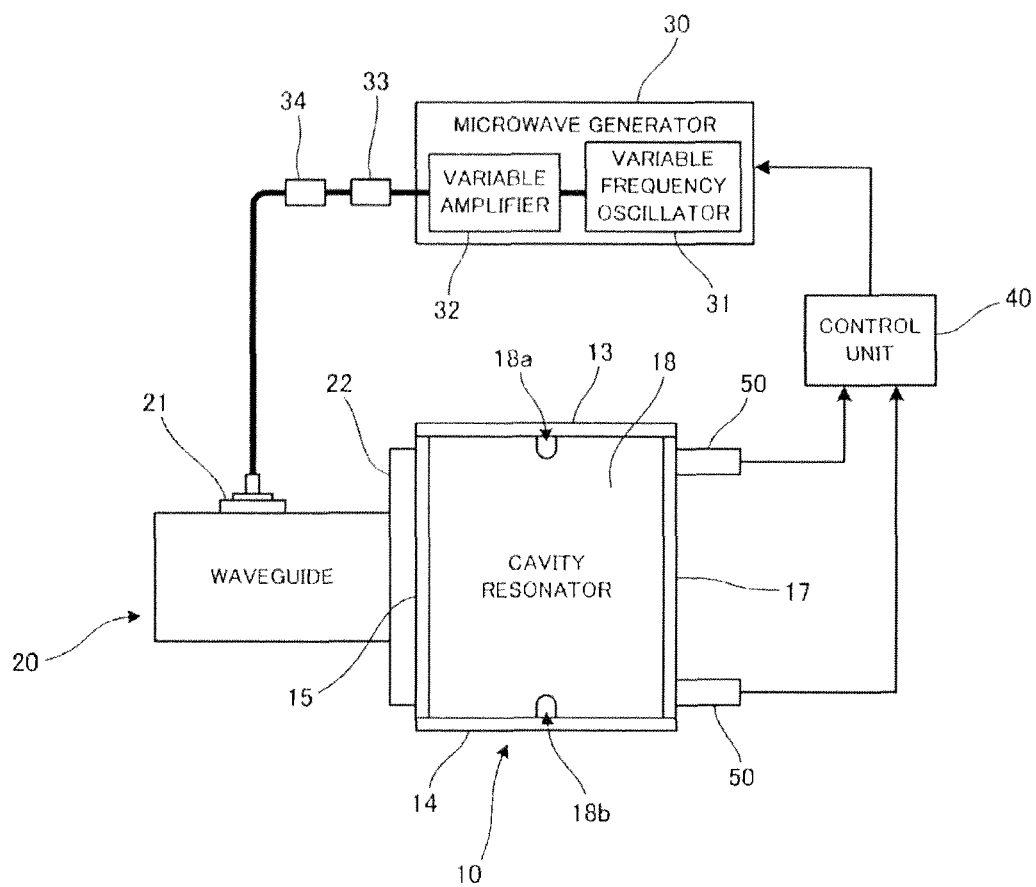
FIG. 1 is a block diagram illustrating a first example of an overall configuration of a microwave device.

FIG. 1 shows a first example of the overall configuration of a microwave device. The microwave device shown in FIG. 1 has a cavity resonator 10 to which a waveguide 20 and a microwave generator 30 are assembled and is configured to be controlled by a control unit 40 such as a personal computer.

The microwave generator 30 contains a variable frequency oscillator 31 and a variable amplifier 32. A microwave whose frequency is variable (for example, 2.4 GHz to 2.5 GHz) is generated by the variable frequency oscillator 31 and power of the microwave is variably amplified by the variable amplifier 32. The frequency of the variable frequency oscillator 31 and power of the variable amplifier 32 are controlled according to the control unit 40. A microwave output from the microwave generator 30 is transmitted to a coaxial-waveguide converter 21 via an isolator 33 and a directional coupler 34 connected by coaxial cables. The microwave via the coaxial-waveguide converter 21 is guided by the waveguide 20 and passes through an iris 11 shown in FIG. 2. The microwave through the iris 11 is introduced into an irradiation chamber 12 formed inside the cavity resonator 10.

Figure 11:
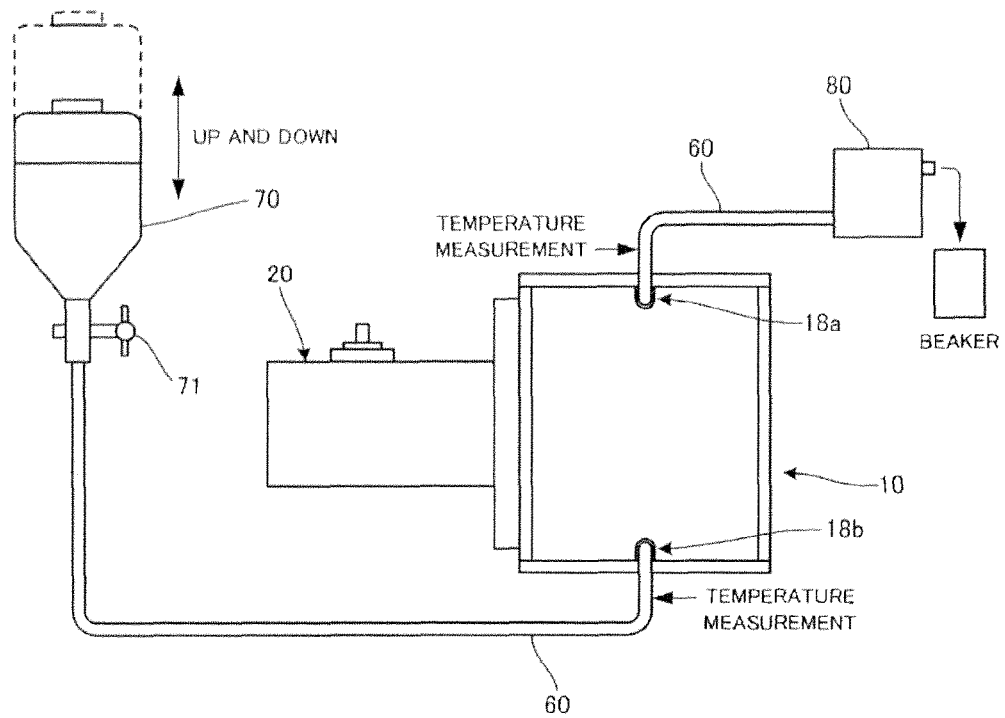
FIG. 11 illustrates a first example of a flow mechanism for flowing the liquid to be treated through the flow tube.

When the microwave is introduced into the irradiation chamber 12, the strength of a magnetic field is detected by two antennas 50 (for example, loop antennas) attached to the cavity resonator 10 so as to be spaced in the center axis direction, and a result of the detection is input into the control unit 40. Also, as shown in FIG. 11 described later, a result of measuring the temperature of the liquid to be treated may be input into the control unit 40. The control unit 40 controls the microwave generator 30 according to the above inputs.

When an operation to start microwave irradiation is performed, the control unit 40 starts to output a microwave from the microwave generator 30 to execute a frequency control process. The frequency control process is the control to synchronize the frequency of a microwave output from the microwave generator 30 with the resonance frequency of the irradiation chamber 12 according to detection results of the antennas 50. The control unit 40 that executes the frequency control process determines a tuning frequency based on detection results by the antennas 50 while sweeping the frequency of the variable frequency oscillator 31. At this point, the control unit 40 may reduce power by the variable amplifier 32 to minimum feeble power to the extent that detection by the antennas 50 is not hindered. By reducing output power of a microwave introduced into the irradiation chamber 12, an influence on the liquid to be treated during execution of the frequency control process can be inhibited.

The feeble power in this case is set to, for example, the following value. The variable amplifier 32 is generally configured by combining a variable attenuator and an amplifier and thus, output power of the variable amplifier 32 when the attenuation factor of the variable attenuator is set to the maximum value (such as 99%) may be set as the feeble power. As an example, the feeble power may be set to 100 mW or less.

Subsequent to the synchronization by the frequency control process, the control unit 40 executes a power control process that controls power of a microwave. The power control process is a process to control power of a microwave by controlling the variable amplifier 32 of the microwave generator 30 according to conditions set by an operator before the start of microwave irradiation. In the power control process, the control unit 40 adjusts power of the microwave output from the microwave generator 30 according to detection results by the antennas 50 (or temperature measurement results of the liquid to be treated). For more correctness, both of detection results of the antennas 50 and temperature measurement results may be used.

As an example, the control unit 40 first executes the frequency control process at the start of microwave irradiation and then executes the power control process and, during execution of the power control process, interrupts the power control process to execute the frequency control process at regular intervals. In the frequency control process, the control unit 40 controls the variable amplifier 32 to output a microwave at the feeble power and also controls the variable frequency oscillator 31 to synchronize the frequency.

The first embodiment of the cavity resonator 10 in a microwave device as described above is shown in FIG. 2.

The cavity resonator 10 in the first embodiment includes top and bottom walls 13, 14 and rectangular sidewalls 15, 16, 17, 18. As shown in FIG. 2, the mutually opposite top and bottom walls 13, 14 arranged one above the other are approximately square. Each of the rectangular sidewalls 15, 16, 17, 18 is fixed to each side of the top and bottom walls 13, 14 by bolts or the like. In the first embodiment, one sidewall 15 shown in FIG. 2B of the four sidewalls 15, 16, 17, 18 has a larger area corresponding to a flange 22 of the waveguide 20 to be connected with the waveguide 20 and enlarged portions thereof protrude from edges of the top and bottom walls 13, 14. Also, one sidewall 18 shown in FIG. 2A of the four sidewalls 15, 16, 17, 18 has flow tube insertion ports 18*a*, 18*b* provided at edges abutting the top and bottom walls 13, 14.

The irradiation chamber 12 is formed inside the cavity resonator 10 in the shape of a rectangular solid formed by assembling the top and bottom walls 13, 14 and the sidewalls 15, 16, 17, 18. The irradiation chamber 12 is a cavity in the shape of a regular quadrangular prism that has approximately square top and bottom faces corresponding to the top and bottom walls 13, 14 and rectangular side faces corresponding to the sidewalls 15, 16, 17, 18. The iris 11 that introduces a microwave into the irradiation chamber 12 is opened as a rectangular opening in a center position of the sidewall 15 forming the irradiation chamber side face. The iris 11 in the first embodiment is rectangular and a long axis thereof extends in parallel with a center axis C through the centers of the irradiation chamber top and bottom faces, that is, the centers of the top and bottom walls 13, 14 in the first embodiment.

A microwave introduced into the irradiation chamber 12 as the regular quadrangular prism cavity from the waveguide 20 through the iris 11, which is a connection slit, generates an electric field in single mode along the direction of the center axis C during resonance. Strictly speaking, an electromagnetic field in TM110 mode is excited if there is nothing inside the cavity resonator 10. Therefore, an electromagnetic field in the distribution approximately according to the electromagnetic field distribution in TM110 mode is generated in the irradiation chamber 12.

The length of one side of an approximate square of the bottom face of the irradiation chamber 12 is set to L. A difference in dimension of about plus or minus several % of L can be tolerated. For the frequency 2,450 MHz of a microwave generally used for heating, L is 86.5 mm when there is nothing in the irradiation chamber 12. Actually, however, a liquid to be treated as a dielectric material is present in the irradiation chamber 12 and thus, the resonance frequency of the irradiation chamber 12 decreases under the influence thereof. Thus, it is better to design L of the irradiation chamber 12 smaller than the dimension when there is nothing in the irradiation chamber 12 and to set L to a value that can resonate when the resonance frequency decreases due to the presence of the liquid to be treated inside the irradiation chamber 12. If L is set longer, in addition to resonance in planned single mode, a malfunction such as mode competition in which resonance occurs in higher mode at frequencies in the neighborhood thereof may arise. As a result of repeated trials of simulations in consideration of the above conditions, it is appropriate to design the length L of one side of an approximate square of the bottom face of the irradiation chamber 12 at 75% or less of the wavelength of a microwave introduced into the irradiation chamber 12. Because an electric field is generated in the direction of the center axis C, a length H (height of the regular quadrangular prism cavity) of a long side of a rectangle of each side face in the irradiation chamber 12 may be designed to have a necessary length as appropriate.

The iris 11 that transmits a microwave from the waveguide 20 to the cavity resonator 10 is involved to limit an electromagnetic field excited in the irradiation chamber 12 to only the planned single mode (TM110 or TM010 described later). In the iris 11 shown in FIG. 2B, a current caused by a microwave flows in the direction of the center axis C on a long side (side edge) and a magnetic field surrounding the center axis C and an electric field parallel to the center axis C are generated by the current. The optimal value of the width (in the direction perpendicular to the center axis C) of the iris 11 can be determined from simulations and experiments. The cavity resonator 10 may generate a TE mode and if the TE mode is generated, unexpected phenomena could occur and thus, it is necessary to reduce generation of the TE mode to a minimum. In the relationship between the waveguide 20 and the iris 11 in FIG. 2, the TE mode can be inhibited because an electric field in the lateral direction in FIG. 2 is not present as long as a structural symmetry with respect to the center axis C is maintained.

FIG. 3 illustrates an arrangement state of a flow tube 60 in the irradiation chamber 12.

Figure 3B:
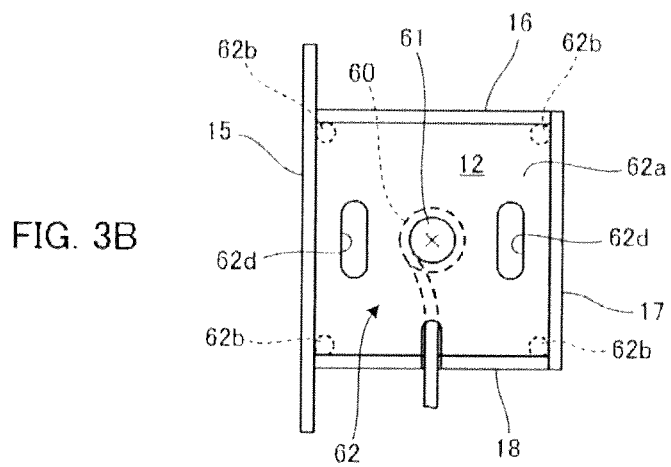
FIG. 3B is a plane view illustrating the irradiation chamber when an upper bottom wall is removed.
Figure 3A:
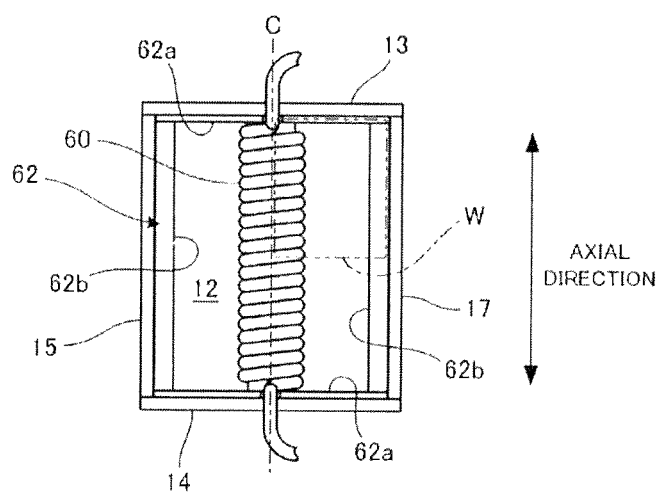
FIG. 3A is a front view illustrating an irradiation chamber when a sidewall is removed.
Figure 3C:
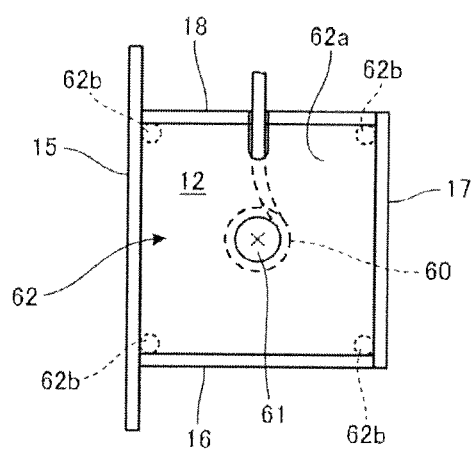
FIG. 3C is a bottom view illustrating the irradiation chamber when a lower bottom wall is removed.

FIG. 3A shows the inside of the irradiation chamber 12 by removing the front sidewall 18, FIG. 3B shows the inside of the irradiation chamber 12 by removing the upper bottom wall 13, and FIG. 3C shows the inside of the irradiation chamber 12 by removing the lower bottom wall 14.

Figure 4:
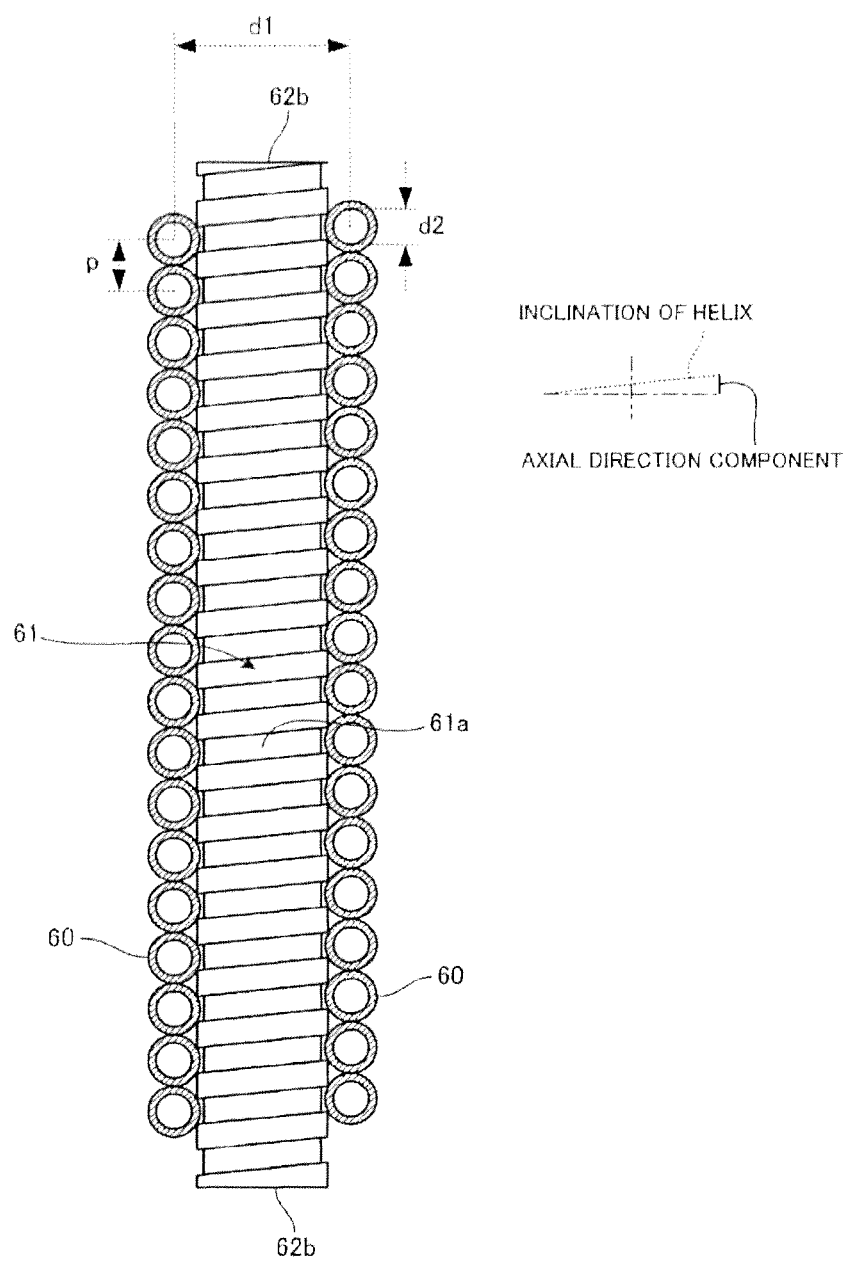
FIG. 4 illustrates a first embodiment of a flow tube.

The flow tube 60 is formed by winding a flexible tube in a helical fashion and a substance, for example PTFE or PP, that absorbs less microwaves and whose relative dielectric constant (real part) is small is used as the material thereof. The center of the winding diameter of the flow tube 60 wound in a helical fashion is approximately matched (apparent matching is enough and an error of, for example, several mm is tolerated) to the center axis C of the irradiation chamber 12. Therefore, the flow tube 60 through which a liquid to be treated flows is provided in a helical fashion extending and winding around the center axis C. Both ends of the flow tube 60 wound in a helical fashion are fetched from the flow tube insertion ports 18a, 18b shown in FIG. 2 and connected to a flow mechanism of the liquid to be treated. The first embodiment of the flow tube 60 and a support rod 61 used to provide the flow tube 60 in a helical fashion is shown in FIG. 4.

The support rod 61 according to the first embodiment is a cylinder made of a material such as PTFE and PP, like the flow tube 60, less likely to absorb a microwave and the axis thereof is arranged inside the irradiation chamber 12 along the center axis C. In FIG. 3, the support rod 61 is arranged in such a way that the center axis thereof approximately matches the center axis C of the irradiation chamber 12. A line of a helical groove 61a is depressed on a circumferential surface of the support rod 61 throughout the length thereof and the flow tube 60 is wound around the support rod 61 by using the helical groove 61a as a guide. With the formation of the helical groove 61a, the flow tube 60 can be wound in a constant pitch p and shifts of the wound flow tube 60 can be prevented.

Figure 5:
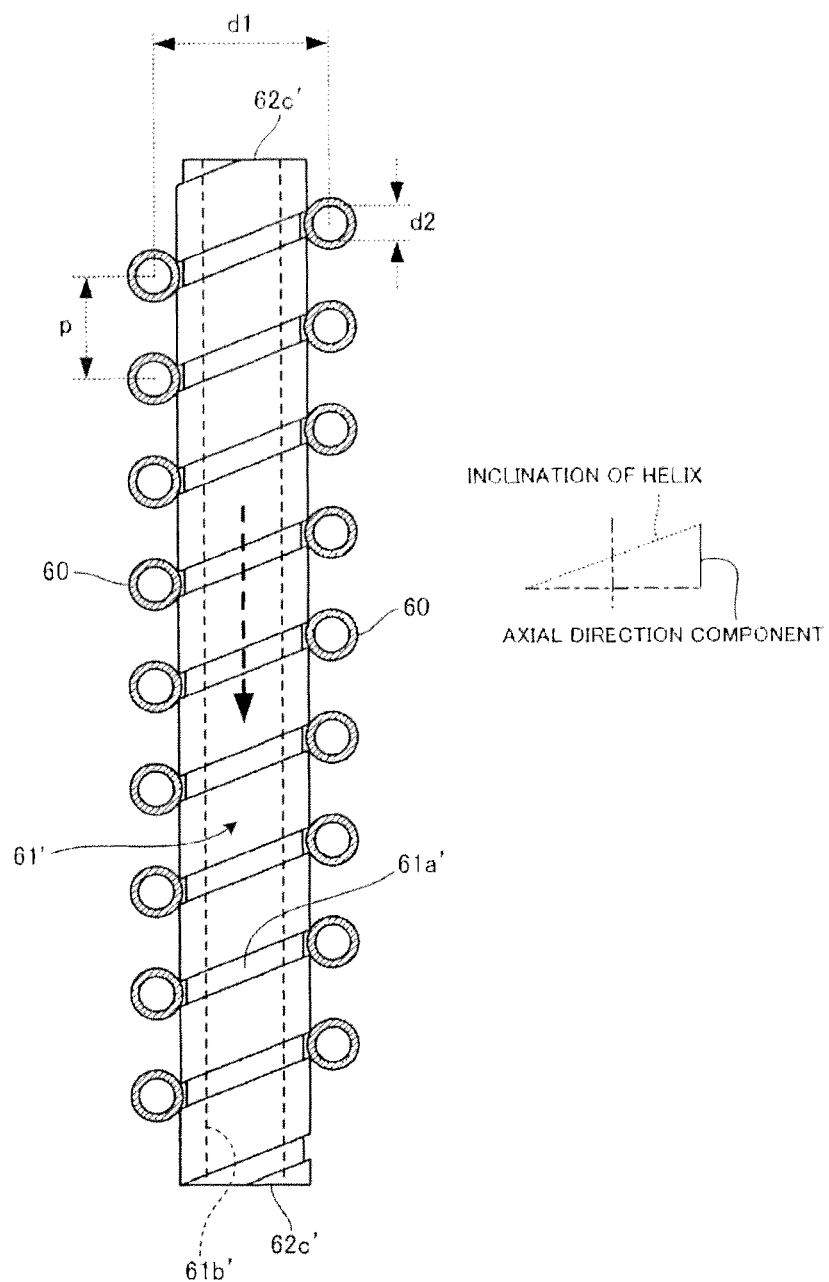
FIG. 5 illustrates a second embodiment of the flow tube.
Figure 6D:
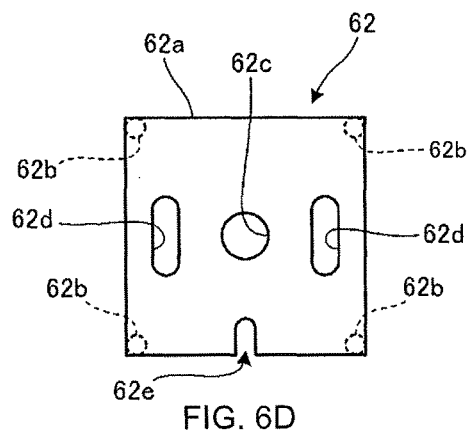
FIG. 6D is a plane view.
Figure 6B:
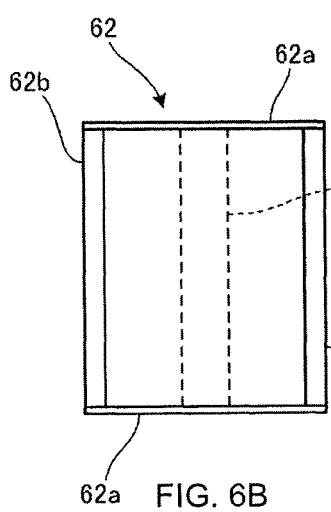
FIG. 6B is a left side view.
Figure 6A:
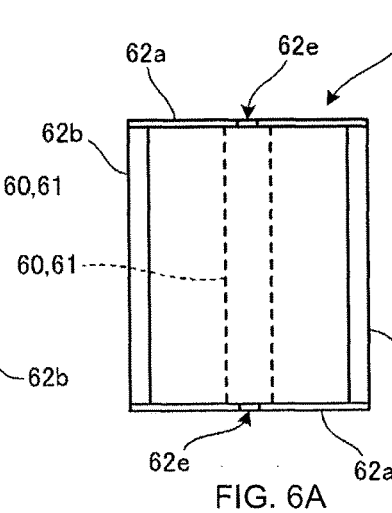
FIG. 6A is a front view.
Figure 6C:
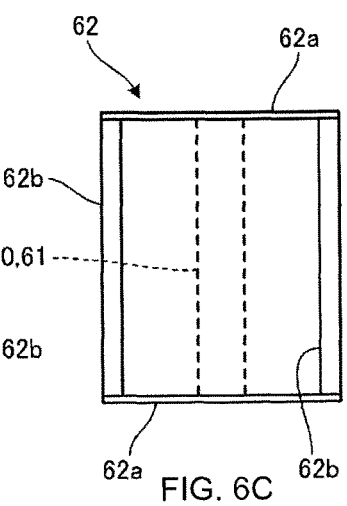
FIG. 6C is a right side view.
Figure 6E:
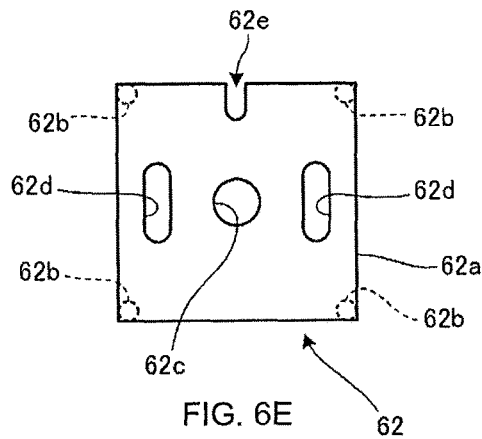
FIG. 6E is a bottom view.

FIG. 5 shows a second embodiment of the flow tube 60 and a support rod 61'. The support rod 61' is, like in the first embodiment, a cylinder made of PTFE or PP and is arranged, like in the first embodiment, in the irradiation chamber 12, but is designed in such a way that the pitch of a helical groove 61a' formed on the circumferential surface thereof is wider (larger) than in the first embodiment and the pitch p of the flow tube 60 is wider than in the first embodiment. If the pitch p of the flow tube 60 is different, the time in which a liquid to be treated remains inside the irradiation chamber 12 changes and therefore, the irradiation time of a microwave changes. Moreover, due to a difference of the pitch p, as shown on the right side in FIG. 5, the inclination of the helical of the flow tube 60 changes and an axial direction component in the flow direction of a liquid to be treated with respect to an electric field in an axial direction inside the irradiation chamber 12 fluctuates. That is, the direction of the dielectric material boundary of a liquid to be treated, which is a dielectric material in a microwave, changes between perpendicular and parallel with respect to the direction of an electric field. Accordingly, microwave energy absorption of the liquid to be treated can be changed (described later).

The support rod 61 or 61' may be formed of alumina (aluminum oxide) whose microwave loss is small and which is superior in thermal conductivity. If the support rod 61 or 61' is made of alumina, heat of a liquid to be treated present in a downstream portion of the flow tube 60 can be conducted to a liquid to be treated present in an upstream portion of the flow tube 60, and hence a uniform temperature property of the liquid to be treated flowing through the flow tube 60 can be improved because of the good thermal conduction. The temperature of the liquid to be treated becomes higher in the downstream portion than in the upstream portion due to heating involved in microwave irradiation. However, the uniform temperature property required from a chemical reaction can be improved by conducting the heat to the upstream portion via the support rod 61 or 61'. For the support rod 61' in the second embodiment, a channel 61b' cutting through in the axial direction is internally formed and a gas or liquid can flow therethrough as a coolant. For example, fluorinert (fluorine base inert gas) can be cited as a coolant that absorbs less microwaves. The coolant flows in a direction opposite to the flow direction of the liquid to be treated and, for example, the coolant flows downward from upward (indicated by an arrow) when the liquid to be treated flows upward from downward in FIG. 5. The uniform temperature property can thereby be further improved. In thermal reaction treatment by a microwave, it may be required that to keep the temperature of a liquid to be treated within permissible levels while the treated liquid is irradiated with a strong microwave. Regarding this requirement, in a conventional device, microwave output power is reduced to meet the requirement when the temperature of the liquid to be treated rises. In contrast, if thermal conduction or coolant action of the support rod 61 or 61' is used, the microwave output power does not have to be decreased as much as in the conventional case.

FIG. 6 shows a jig 62 for arranging the helical flow tube 60 wound around the support rod 61 or 61' in a fixed position inside the irradiation chamber 12. The jig 62 is also formed of PTFE or PP, and contains two bottom plates 62a and four columns 62b. The bottom plates 62a are approximately square (one side is approximately L) corresponding to the bottom face of the irradiation chamber 12 and have the mutually identically shape. The four columns 62b have the length (approximately H) corresponding to the long side of the side face of the irradiation chamber 12. The jig 62 is assembled by fixing the columns 62b to four corners of the bottom plates 62a opposite to each other. For example, screws formed from engineering plastics may be used to fix the columns 62b. The bottom plates 62a have a thickness of about 5 mm and have fitting holes 62c opened in a center position of the square. Ends 61b or 61c' of the support rod 61 or 61' are fitted into the fitting holes 62c. By fitting and fixing the support rod 61 or 61' into the fitting holes 62c, the support rod 61 or 61' is arranged along the center axis C and the helical flow tube 60 is arranged around the center axis C when the jig 62 is inserted into the irradiation chamber 12.

The bottom plate 62a further has two gripping holes 62d serving as a handle when the jig 62 is inserted/removed into/from the irradiation chamber 12. The bottom plate 62a also has a notch 62e to pull out the flow tube 60 in a position corresponding to each of the flow tube insertion ports 18a, 18b opened in the sidewall 18 of the cavity resonator 10. The jig 62 is inserted into the irradiation chamber 12 after the end 61b of the support rod 61 (or the support rod 61') is fitted and fixed to the fitting hole 62c, the flow tube 60 is wound around the support rod 61, and an end thereof is pulled out via the notch 62e. By adopting the method that the flow tube 60 which is wound around the support rod 61 is inserted into the irradiation chamber 12 by using the jig 62, the flow tube 60 can always be arranged in a fixed position inside the irradiation chamber 12, and hence superior reproducibility of treatment is achieved. The flow tube 60 can also be replaced easily by replacing the jig 62.

Figure 7C:
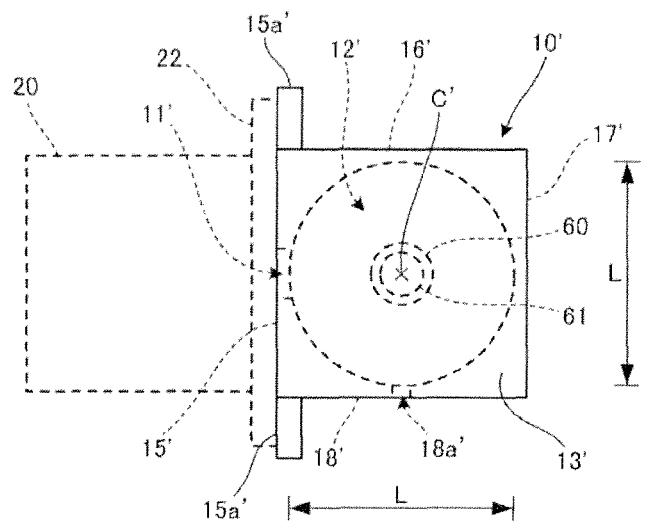
FIG. 7C is a plane view.
Figure 7B:
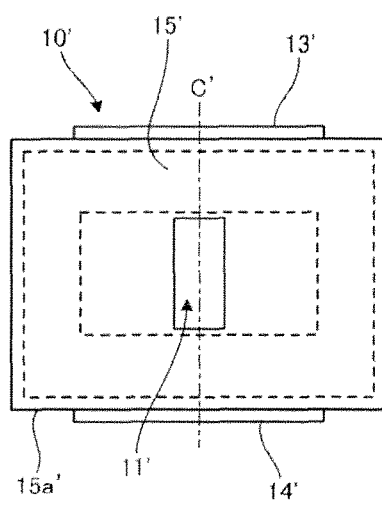
FIG. 7B is a left side view.
Figure 7A:
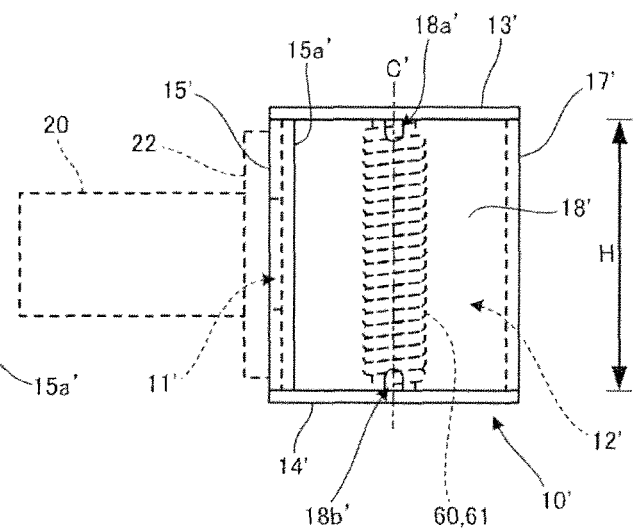
FIG. 7A is a front view when viewed from the same side as FIG. 1.

FIG. 7 illustrates the second embodiment of a cavity resonator.

A cavity resonator 10' in the second embodiment has an irradiation chamber 12' in the shape of a cylindrical cavity and the diameter of the irradiation chamber 12' is L.

The irradiation chamber 12' in the shape of a cylindrical cavity is formed by hollowing out (cutting out) a trunk member in a regular quadrangular prism shape to form a cylinder and fixing square top and bottom walls 13', 14' to both ends thereof by bolts. Then, an iris 11', like in the first embodiment, is opened in one location of sidewalls forming the side faces (that is, an inner circumferential surface of the trunk member) of the irradiation chamber 12', in the second embodiment, in an outer surface 15' of outer surfaces 15', 16', 17', 18' of the trunk member. That is, this iris 11' is also a rectangular opening whose long axis extends in parallel with a center axis C' through the centers of both top and bottom faces of the irradiation chambers 12'. Further, one outer surface 18' shown in FIG. 7A of the outer surfaces 15', 16', 17', 18' has flow tube insertion ports 18a', 18b' provided at edges abutting the top and bottom walls 13', 14'. Also, collars 15a' are enlarged and formed on the outer surface 15' to fix the flange 22 of the waveguide 20 transmitting a microwave via the iris 11'.

The flow tube 60 and the support rod 61 (61') similar to the above-mentioned embodiments are arranged inside the irradiation chamber 12' in the shape of a cylindrical cavity. Like the cavity resonator 10 in the first embodiment, the center of the winding diameter of the flow tube 60 wound in a helical fashion is approximately matched to the center axis C' of the irradiation chamber 12' and thus, the flow tube 60 is provided in a helical fashion extending and winding around the center axis C'. The support rod 61 is also arranged inside the irradiation chamber 12' by aligning the axis thereof along the center axis C'.

A microwave introduced into the irradiation chamber 12' from the waveguide 20 through the iris 11' generates an electric field in single mode along the direction of the center axis C' during resonance. Because the irradiation chamber 12' has the cylindrical cavity shape, an electromagnetic field in TM010 mode is excited in the second embodiment if there is nothing in the cavity resonator 10'. If the frequency of a resonant microwave is set to 2,450 MHz, the diameter L is 93.7 mm when there is nothing in the irradiation chamber 12'. Like the cavity resonator 10 in the first embodiment, a difference in dimension of about plus or minus several % of L can be tolerated.

Like the cavity resonator 10 in the first embodiment, a liquid to be treated as a dielectric material is present in the irradiation chamber 12' and thus, the resonance frequency of the irradiation chamber 12' decreases under the influence thereof. Therefore, L of the irradiation chamber 12' is designed smaller than the dimension when there is nothing in the irradiation chamber 12'. If, as described above, L is set longer, a malfunction such as mode competition in which resonance occurs in higher mode may arise and thus, in consideration of these conditions, it is appropriate to design the diameter L of a circle formed by the bottom face in the irradiation chamber 12' at 80% or less of the wavelength of a microwave introduced into the irradiation chamber 12'. Because an electric field is generated in the direction of the center axis C', an axial direction length H (height of the cylinder) of the side face of the irradiation chamber 12' may be designed to have a necessary length as appropriate.

When the cavity resonator 10 in the first embodiment and the cavity resonator 10' in the second embodiment are compared, the cavity resonator 10 in the first embodiment can be produced only by mutually assembling six plates and mounting of the waveguide 20 is easier and thus, the first embodiment has an advantage of being easier to produce.

In the cavity resonator 10 or 10' according to any one of the embodiments, a helical winding diameter d1 of the flow tube 60 is decided in response to the diameter of the cross section of the support rod 61 (61'). The diameter d1 is decided as described below.

In the cavity resonator 10 according to the first embodiment, the transverse plane of the irradiation chamber 12 is approximately square and thus, an electric field changes depending on the location in a circumferential direction rotating around the center axis C. That is, the electric field changes along the direction of the flow of the flow tube 60. Simulation results of the above state are shown in FIG. 8. The graph in FIG. 8 is a graph of changes of an electric field by setting the angle in the circumferential direction as the horizontal axis of the graph. As is evident by referring to FIG. 8, the electric field along the flow tube 60 represents a major change with an increase of d1 with respect to L, that is, with an increase in distance (d1/2) from the center axis C to the center (inner diameter center) of the flow tube 60. Therefore, in consideration of uniformity of treatment, it is better to reduce d1 to a size in which the change in the electric field has an insignificant effect. In consideration of simulation results, the electric field can be regarded approximately constant if d1/L equal to or less than 0.5 and thus, it is preferable to set d1 to 50% or less of one side L of the approximate square forming the bottom face of the irradiation chamber 12, that is, d1/2, which is the distance from the center axis C to the center of the flow tube 60 to 25% or less thereof.

Figure 9:
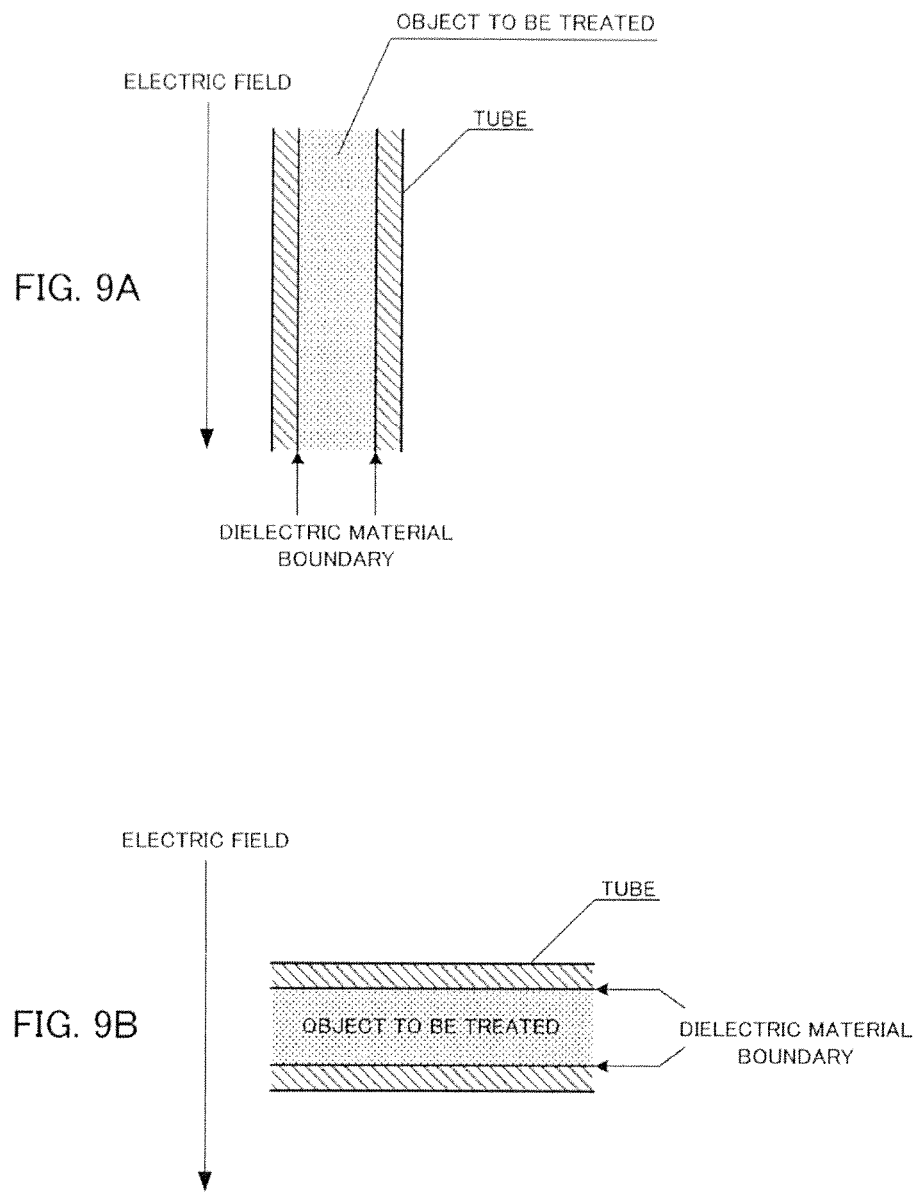
FIG. 9 illustrates a relationship between a flow direction of a liquid to be treated and the electric field.

The direction of an electric field with respect to a liquid to be treated flowing in the irradiation chamber 12 (12') will be described with reference to FIGS. 9 and 10. FIG. 9A shows a case when a flow direction of a flow tube is parallel to the center axis C of the irradiation chamber 12 and FIG. 9B shows a case when the flow direction of the flow tube 60 is a direction that crosses the center axis C. The direction of an electric field is, as described above, parallel to the center axis C in the irradiation chamber 12. The liquid to be treated flowing through the flow tube CaO be regarded as a dielectric material and thus, the dielectric material boundary and the electric field are parallel in FIG. 9A and the dielectric material boundary crosses the electric field in FIG. 9B. If the dielectric material boundary and the electric field are parallel, the strength of the electric field is the same inside and outside the dielectric material. When the dielectric material boundary crosses the electric field, the strength of the electric field is weakened to 1/[relative dielectric constant] (more strictly, $1/\varepsilon r'$) in the dielectric material. That is, the electric field in the liquid to be treated changes depending on the flow direction of the liquid to be treated.

Microwave power (energy per unit time) absorbed by a dielectric material is given by the following formula:

$$P_L = \frac{1}{2}\oint_V \omega \varepsilon_0 \varepsilon_r'' E^2 dv$$

where $\omega$ is the angular frequency, $\varepsilon_0$ is the vacuum dielectric constant and is given by $8.854 \times 10^{-12}$ (Coulomb/m). The relative dielectric constant (complex number) $\varepsilon r$ is defined by $\varepsilon r = \varepsilon r' - j\varepsilon r''$.

For example, in the case of water, $\varepsilon r'$ of water is 80 (ordinary temperature) and $\varepsilon r''$ thereof is about 10 and thus, the strength of the electric field in FIG. 9B is $\frac{1}{80}$ when compared with FIG. 9A.

That is, when water flows through the flow tube, absorption of a microwave is very good in the case of FIG. 9A in which water flows along the center axis C, but absorption of a microwave is very poor in the case of FIG. 9B in which water flows around the center axis C in a helical fashion.

As a result of experiment using the cavity resonator 10 in the first embodiment by placing a flow tube 60 of a "straight tube" to flow water on the center axis C (that is, the tube axis=the center axis C), the fall of Q to about 100 is measured even if the inside diameter of the straight tube is made smaller to 1.5 mm. If Q is small, it becomes difficult to synchronize and even if synchronization is successful, energy of microwaves accumulated inside the irradiation chamber 12 decreases so that a strong electric field cannot be generated and advantages as a resonator are lost.

Figure 10:
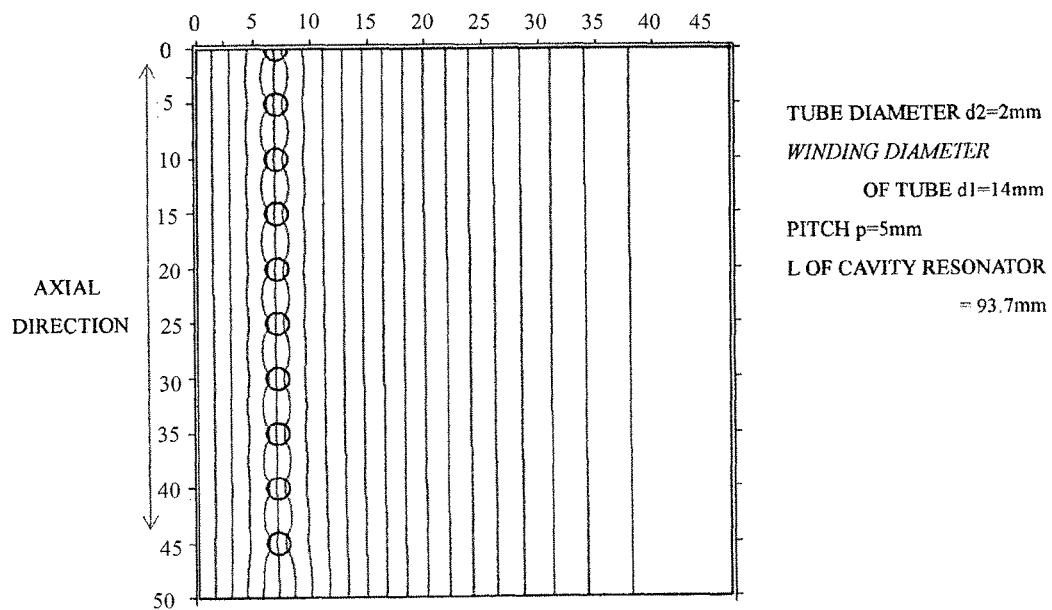
FIG. 10 illustrates simulation results in a center axis direction of the cavity resonator, regarding the electric field in the cavity resonator according to the second embodiment (or the first embodiment)

Simulation result of an electric field in the irradiation chamber 12' of the cavity resonator 10' in the second embodiment (or the first embodiment) is shown in FIG. 10. It is assumed that the flow tube 60 in a helical fashion wound around the support rod 61 is arranged in the irradiation chamber 12' (the flow tube is indicated by the circles in FIG. 10). However, for the convenience of calculation, the flow tube 60 is assumed to be circular with the diameter d1. Also, it is assumed that water as a liquid to be treated flows, and since the dielectric constant of the flow tube 60 is sufficiently smaller than the dielectric constant of water, the dielectric constant of the flow tube is ignored. The vertical axis in FIG. 10 denotes the distance in the direction of the center axis C' and the horizontal axis thereof denotes the distance from the center axis C' in the radial direction (direction perpendicular to the center axis). The region shown in FIG. 10 corresponds to a ¼ region W indicated in FIG. 3A.

Vertical lines illustrated in FIG. 10 are electric lines of force, i.e., envelopes of an electric field and the electric field is along these lines. Electric lines of force and the electric field are slightly disturbed near water (indicated by the circles), but are straight lines approximately parallel to the center axis C'. That is, the electric field is parallel to the center axis C' and does not change in the axial direction. L=93.7 mm is assumed for calculation, as indicated in FIG. 10, and the cavity resonator 10' resonates at 2,450 MHz if there is nothing in the irradiation chamber 12', but the resonance frequency decreases by 36 MHz if water in a helical fashion flows. However, this level of decrease is smaller than when there is a water column of diameter 1 mm on the center axis C'. If the helical flow tube 60 of the same inside diameter is put into the irradiation chamber 12', the amount of water retained inside the irradiation chamber 12' increases 40 times.

As is evident from the above formula, if the helical flow tube 60 is arranged in the irradiation chamber 12', the absorbed amount of microwave energy of the liquid to be treated per unit volume significantly decreases and thus, the comprehensive absorbed amount of microwave energy is sufficiently small compared with the flow tube of a "straight tube" along the center axis C' and therefore, high Q can be obtained.

In the above microwave device, as described above, an electric field parallel to the center axis is generated in the irradiation chamber of the cavity resonator and then, the liquid to be treated flowing through the helical flow tube flows in a direction crossing the electric field. With this structure, the liquid to be treated, that is, the boundary of a dielectric material is in a direction crossing the electric field and thus, energy absorbed by the liquid to be treated per unit time is reduced and the decrease in Q is inhibited. Therefore, even if the flow rate of the liquid to be treated is increased by using a flow tube of a larger diameter d2 than in the conventional case (as an example, d2=3 mm), the decrease in Q is significantly mild and Q can be kept at an appropriate value. By adopting the flow tube in a helical fashion, when compared with a straight flow tube, the distance of flow of the liquid to be treated in the irradiation chamber is elongated so that the residence time in the irradiation chamber can be gained while the strength of a microwave absorbed by the liquid to be treated being maintained constant. As a result of the foregoing, uniform and efficient treatment by a single-mode cavity resonator is achieved.

An example of a flow mechanism flowing the liquid to be treated into the flow tube 60 is shown in FIG. 11. However, a flow mechanism is not limited to the shown embodiment and a flow mechanism in which a liquid sending system is configured by a liquid sending pump may also be used.

The cavity resonator 10 in the first embodiment is installed and the helical flow tube 60 is accommodated in the irradiation chamber 12 as described above. Of both ends of the flow tube 60 pulled out from the flow tube insertion ports 18a, 18b, the end pulled out from the lower side is connected to a container 70 storing a liquid to be treated before treatment and the end pulled out from the upper side is connected to a container 80 storing a treated liquid (after treatment). The container 70 before treatment includes a flow rate control cock 71 in a bung hole and a vertical position thereof can be adjusted. A treated liquid flows into the container 80 after treatment from a lower end position and when the stored liquid is reached to the bung hole in an upper position, the treated liquid is discharged into a beaker. The flow mechanism is a mechanism for flowing the liquid to be treated upward from a lower portion of the flow tube 60 inside the irradiation chamber 12 and the flow of the liquid to be treated can be controlled by adjusting the height of the container 70 and the flow rate control cock 71. The treated liquid can be accumulated up to the height of the liquid level of the container 70 before treatment, in the container 80.

Temperature measurements before and after treatment may be made by providing a non-contact thermometer to measure the temperature of the liquid to be treated in the flow tube 60 pulled out from the flow tube insertion ports 18a, 18b to provide measurement results to the control unit 40 in FIG. 1.

Figure 12:
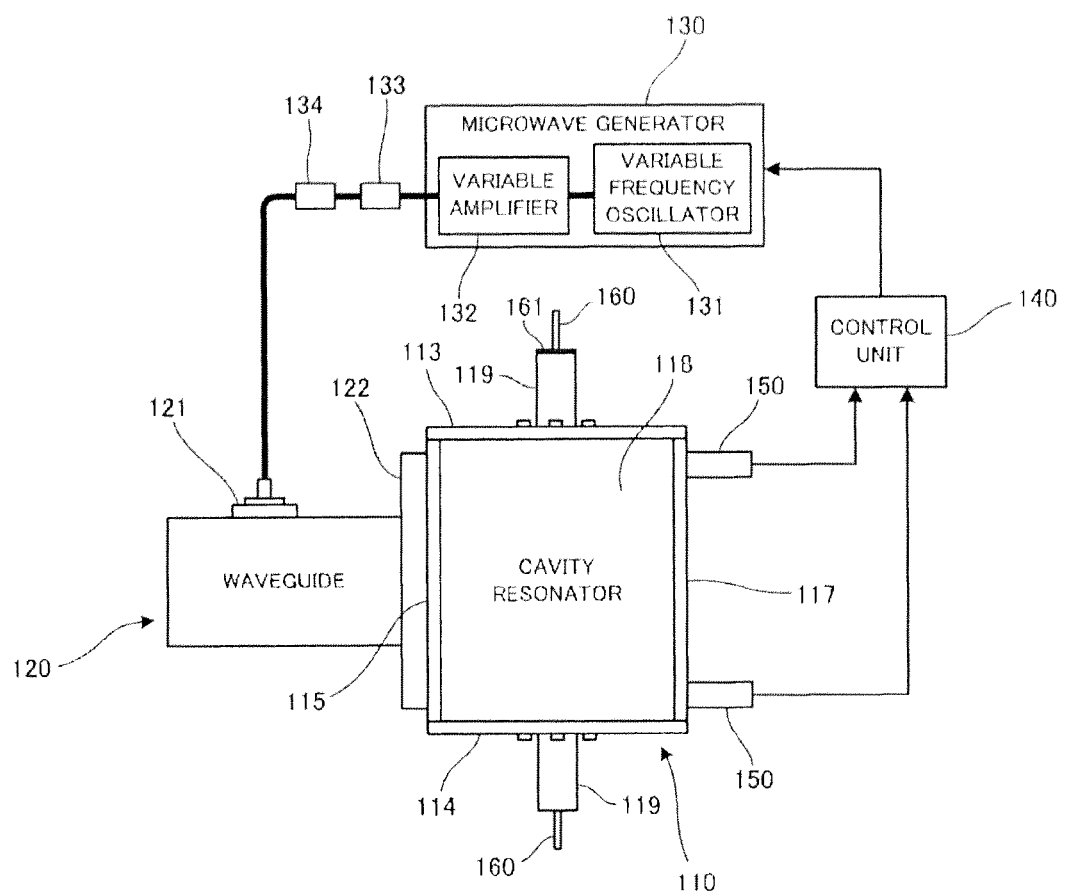
FIG. 12 is a block diagram illustrating a second example of an overall configuration of a microwave device.

Next, a second example of the overall configuration of the microwave device will be described with reference to FIG. 12. The shown microwave device is configured, like in the first embodiment, by assembling a waveguide 120 and a microwave generator 130 to a cavity resonator 110 and these are controlled by a control unit 140 such as a personal computer.

The microwave generator 130 contains a variable frequency oscillator 131 and a variable amplifier 132. A microwave whose frequency is variable (for example, 2.4 GHz to 2.5 GHz) is output by the variable frequency oscillator 131 and power of the microwave is variably amplified by the variable amplifier 132. The frequency of the variable frequency oscillator 131 and power of the variable amplifier 132 are controlled according to the control unit 140. A microwave output from the microwave generator 130 is transmitted to a coaxial-waveguide converter 121 via an isolator 133 and a directional coupler 134 connected by coaxial cables. The microwave guided by the waveguide 120 via the coaxial-waveguide converter 121 passes through an iris 111 (111') shown in FIG. 13 (or FIG. 14), and then is introduced into an irradiation chamber 112 (112') of a resonant cavity formed inside the cavity resonator 110 (110').

If the microwave is introduced into the irradiation chamber 112 (112'), the strength of a magnetic field is detected by two antennas 150 (for example, loop antennas) attached to the cavity resonator 110 (110') so as to be spaced in the center axis direction, and a result of the detection is input into the control unit 140. For example, one of the two antennas is used for observation and the other is used for control. However, attaching of two antennas is not required. As will be described below, a result of measuring the temperature of the liquid to be treated may also be input into the control unit 140. The control unit 140 controls the microwave generator 130 according to the above inputs.

When an operation to start microwave irradiation is performed, the control unit 140 starts to output a microwave from the microwave generator 130 to execute a frequency control process. The frequency control process is the control to synchronize the frequency of a microwave output from the microwave generator 130 with the resonance frequency of the irradiation chamber 112 (112') according to detection results of the antennas 150. The control unit 140 that executes the frequency control process determines a tuning frequency based on detection results by the antennas 150 while sweeping the frequency of the variable frequency oscillator 131. At this point, the control unit 140 may reduce power by the variable amplifier 132 to minimum feeble power to the extent that detection by the antennas 150 is not hindered. By reducing output power of a microwave introduced into the irradiation chamber 112 (112'), an influence on the liquid to be treated during execution of the frequency control process can be inhibited.

The feeble power in this case is set to, for example, the following value. The variable amplifier 132 is generally configured by combining a variable attenuator and an amplifier and thus, output power of the variable amplifier 132 when the attenuation factor of the variable attenuator is set to the maximum value (such as 99%) may be set as the feeble power. As an example, the feeble power may be set to 100 mW or less.

Subsequent to the synchronization by the frequency control process, the control unit 140 executes a power control process that controls power of a microwave. The power control process is a process to control power of a microwave by controlling the variable amplifier 132 of the microwave generator 130 according to conditions set by an operator before the start of microwave irradiation. In the power control process, the control unit 140 adjusts power of the microwave output from the microwave generator 130 according to detection results by the antennas 150 (or temperature measurement results of the liquid to be treated).

For more correctness, both of detection results of the antennas 150 and temperature measurement results may be used.

As an example, the control unit 140 first executes the frequency control process at the start of microwave irradiation and then executes the power control process and, during execution of the power control process, interrupts the power control process to execute the frequency control process at regular intervals. In the frequency control process, the control unit 140 controls the variable amplifier 132 to output a microwave at the feeble power and also controls the variable frequency oscillator 131 to synchronize the frequency.

A third embodiment of a cavity resonator in a microwave device as described above is shown in FIG. 13.

Figures 13A, 13B, 13C:
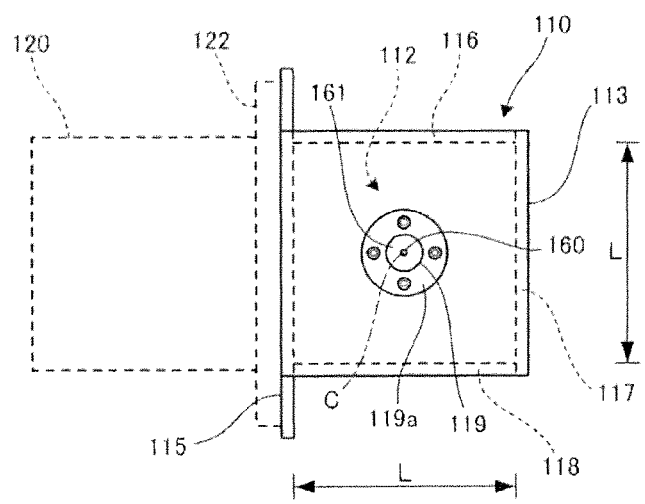
FIG. 13A is a front view when viewed from the same side as FIG. 12.
FIG. 13B is a left side view.
FIG. 13C is a plane view.

The cavity resonator 110 in the third embodiment includes two top and bottom walls 113, 114 and rectangular sidewalls 115, 116, 117, 118. As shown in FIG. 13, the mutually opposite top and bottom walls 113, 114 arranged one above the other are approximately square. Each of the rectangular sidewalls 115, 116, 117, 118 is fixed to each side of the top and bottom walls 113, 114 by bolts or the like. In the present embodiment, one sidewall 115 shown in FIG. 13B of the four sidewalls 115, 116, 117, 118 has a larger area corresponding to a flange 122 of the waveguide 120 to be connected with the waveguide 120 and enlarged portions thereof protrude from edges of the top and bottom walls 113, 114.

The irradiation chamber 12 is formed inside the cavity resonator 110 in the shape of a rectangular solid formed by assembling the top and bottom walls 113, 114 and the sidewalls 115, 116, 117, 118. The irradiation chamber 112 is a cavity in the shape of a quadrangular prism (regular quadrangular prism) that has approximately square top and bottom faces corresponding to the top and bottom walls 113, 114 and rectangular side faces corresponding to the sidewalls 115, 116, 117, 118. The iris 111 that introduces a microwave into the irradiation chamber 112 is opened as a rectangular opening in a center position of the sidewall 115 forming the irradiation chamber side face. The iris 111 in the third embodiment is rectangular and a long axis thereof extends in parallel with the center axis C through the centers of the irradiation chamber top and bottom faces, that is, the centers of the top and bottom walls 113, 114 in the present embodiment.

A microwave introduced into the irradiation chamber 112 as the quadrangular prism cavity from the waveguide 120 through the iris 111, which is a connection slit, generates an electric field in single mode along the direction of the center axis C during resonance. Strictly speaking, an electromagnetic field in TM110 mode is excited if there is nothing inside the cavity resonator 110. Therefore, an electromagnetic field in the distribution approximately according to the electromagnetic field distribution in TM110 mode is generated in the irradiation chamber 112.

The length of one side of an approximate square of the bottom face of the irradiation chamber 112 is set to L. A difference in dimension of about plus or minus several % of L can be tolerated. For the frequency 2,450 MHz of a microwave generally used for heating, L is 86.5 mm when there is nothing in the irradiation chamber 112. Actually, however, a liquid to be treated as a dielectric material is present in the irradiation chamber 112 and thus, the resonance frequency of the irradiation chamber 112 decreases under the influence thereof. Thus, it is better to design L of the irradiation chamber 112 smaller than the dimension when there is nothing in the irradiation chamber 112 and to set L to a value that can resonate when the resonance frequency decreases due to the presence of the liquid to be treated inside the irradiation chamber 12. If L is set longer, in addition to resonance in planned single mode, a malfunction such as mode competition in which resonance occurs in higher mode at frequencies in the neighborhood thereof may arise. As a result of repeated trials of simulations in consideration of the above conditions, it is appropriate to design the length L of one side of an approximate square of the bottom face of the irradiation chamber 112 at 75% or less of the wavelength of a microwave introduced into the irradiation chamber 112. Because an electric field is generated in the direction of the center axis C, the length H (height of the regular quadrangular prism cavity) of a long side of a rectangle of each side face in the irradiation chamber 112 may be designed to have a necessary length as appropriate.

The iris 111 that transmits a microwave from the waveguide 120 to the cavity resonator 110 is involved to limit an electromagnetic field excited in the irradiation chamber 112 to only the planned single mode (TM110 or TM010 described later). In the iris 111 shown in FIG. 13B, a current caused by a microwave flows in the direction of the center axis C on a long side (side edge) and a magnetic field surrounding the center axis C and an electric field parallel to the center axis C are generated by the current. The optimal value of the width (in the direction perpendicular to the center axis C) of the iris 111 can be determined from simulations and experiments. The cavity resonator 110 may generate a TE mode and if the TE mode is generated, unexpected phenomena could occur and thus, it is necessary to reduce generation of the TE mode to a minimum. In the relationship between the waveguide 120 and the iris 111 in FIG. 13, the TE mode can be inhibited because an electric field in the lateral direction in FIG. 13 is not present as long as a structural symmetry with respect to the center axis C is maintained.

Figure 14B:
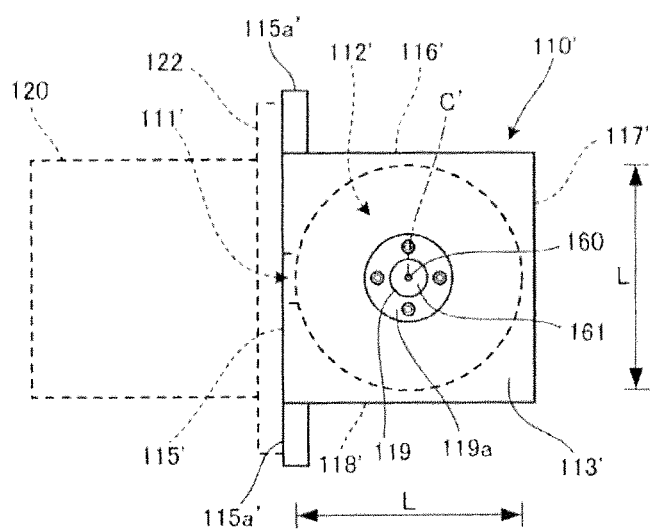
FIG. 14B is a left side view.
Figure 14A:
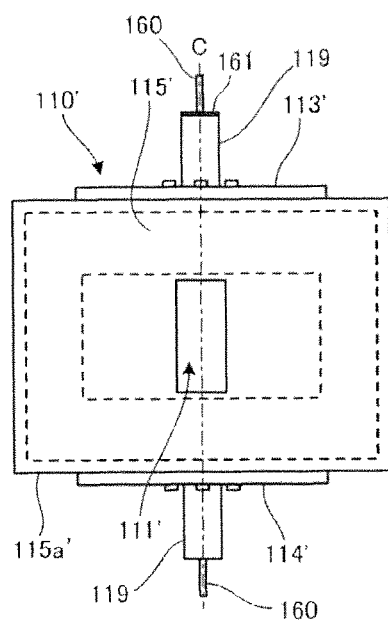
FIG. 14A is a front view when viewed from the same side as FIG. 12.
Figure 14C:
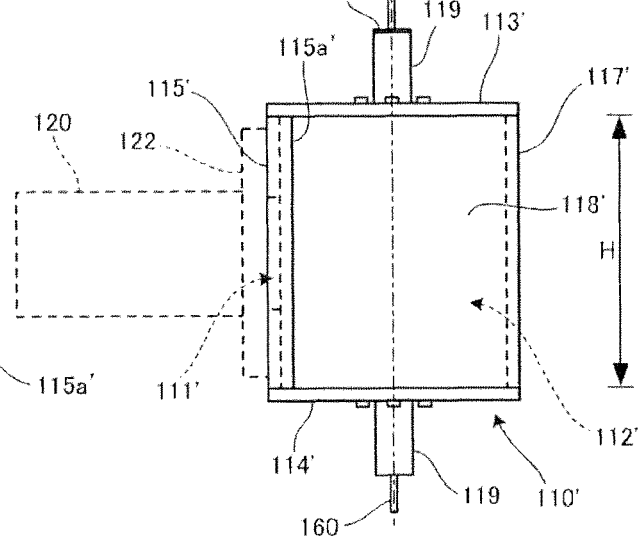
FIG. 14C is a plane view.

FIG. 14 illustrates a fourth embodiment of a cavity resonator.

A cavity resonator 110' in the fourth embodiment has an irradiation chamber 112' in the shape of a cylindrical cavity and the diameter of the irradiation chamber 112' is L.

The irradiation chamber 112' in the shape of a cylindrical cavity is formed by hollowing out (cutting out) a trunk member in a regular quadrangular prism shape to form a cylinder and fixing square top and bottom walls 113', 114' to both ends thereof by bolts. Then, an iris 111', like the case of the cavity resonator 110 in the third embodiment, is opened in one location of sidewalls forming the side faces (that is, the inner circumferential surface of the trunk member) of the irradiation chamber 112', in the fourth embodiment, in an outer surface 115' of outer surfaces 115', 116', 117', 118' of the trunk member. That is, this iris 111' is also a rectangular opening whose long axis extends in parallel with the center axis C' through the centers of both top and bottom faces of the irradiation chambers 112'. Also, collars 115a' are enlarged and formed on the outer surface 115' to fix the flange 122 of the waveguide 120 transmitting a microwave via the iris 111'.

A microwave introduced into the irradiation chamber 112' from the waveguide 120 through the iris 111' generates an electric field in single mode along the direction of the center axis C' during resonance. Because the irradiation chamber 112' has the cylindrical cavity shape, an electromagnetic field in TM010 mode is excited in the fourth embodiment if there is nothing in the cavity resonator 110'. If the frequency of a resonant microwave is set to 2,450 MHz, the diameter L is 93.7 mm when there is nothing in the irradiation chamber 112'. Like the cavity resonator 110 in the third embodiment, a difference in dimension of about plus or minus several % of L can be tolerated.

Like the cavity resonator 110 in the third embodiment, a liquid to be treated as a dielectric material is present in the irradiation chamber 112' and thus, the resonance frequency of the irradiation chamber 112' decreases under the influence thereof. Therefore, L of the irradiation chamber 112' is designed smaller than the dimension when there is nothing in the irradiation chamber 112'. If, as described above, L is set longer, a malfunction such as mode competition in which resonance occurs in higher mode may arise and thus, in consideration of these conditions, it is appropriate to design the diameter L of a circle formed by the bottom face in the irradiation chamber 112' at 80% or less of the wavelength of a microwave introduced into the irradiation chamber 112'. Because an electric field is generated in the direction of the center axis C', the axial direction length H (height of the cylinder) of the side face of the irradiation chamber 112' may be designed to have a necessary length as appropriate.

When the cavity resonator 110 in the third embodiment and the cavity resonator 110' in the fourth embodiment are compared, the cavity resonator 110 in the third embodiment can be produced only by mutually assembling six plates and mounting of the waveguide 120 is easier and thus, the third embodiment has an advantage of being easier to produce.

The third embodiment of a flow tube installed in the irradiation chambers 112, 112' of the cavity resonators 110, 110' according to the third and fourth embodiments will be described by illustrating FIGS. 15 and 16.

A flow tube 160 in the third embodiment is made of a material whose microwave absorption is relatively poor (or no absorption), as an example, quartz glass and is a straight tube having a length cutting through the irradiation chamber 112 or 112'. The flow tube 160 is installed in the irradiation chamber 112 or 112' by aligning an axis line C1 thereof along the center axis C or C', which is in an electric field direction of the irradiation chamber 112 or 112', particularly in the present embodiment, by approximately matching the axis line C1 to the center axis C or C' (an error of several mm is tolerated). As described above, the center axis C or C' of the irradiation chamber 112 or 112' matches the electric field direction and is a location where the electric field is the strongest and thus, the liquid to be treated can be treated most efficiently by installing the flow tube 160 in such a way that the axis line C1 is approximately matched to the center axis C or C'. A mechanism to install the flow tube 160 by approximately matching the axis line C1 to the center axis C or C' as described above is shown in a sectional view in FIG. 15.

Upright cylindrical members 119 of the height of about 50 mm are attached to outsides of center positions of the top and bottom walls 113, 114 (113', 114') constituting the cavity resonators 110, 110'. The cylindrical members 119 hold the flow tube 160 without a leak of a microwave generated inside the irradiation chambers 112, 112'. The cylindrical member 119 has the diameter of about 20 mm (designed appropriately according to the size of the flow tube 160), and has a flange 119a formed around a bottom portion thereof. A recess in a corresponding shape provided on the outer surface of each of the top and bottom walls 113, 114 (113', 114') receives the flange 119a, and the flange 119a is fixed by tightening hexagon socket head cap screws. Internal spaces of the fixed cylindrical members 119 are communicatively connected to through holes 113a, 114a (113'a, 114'a) provided in the centers of the recesses of the top and bottom walls 113, 114 (113', 114'). The center axis of the fixed cylindrical member 119 approximately matches the center axis C or C' of the irradiation chamber 112 or 112'.

A cap member 161 made of metal, natural resin, or synthetic resin in a disc shape is attached to a predetermined position on one end of the flow tube 160. In the present embodiment, the cap member 161 is fitted to the cylindrical member 119 fixed on the bottom wall 113 or 113'. That is, a swelling portion 161a having the diameter corresponding to the inside diameter of the cylindrical member 119 is formed on the inner surface of the cap member 161, and the cap member 161 is fixed by the swelling portion 161a being fitted into the cylindrical member 119. Accordingly, the flow tube 160 to which the cap member 161 is attached is held inside the cylindrical member 119. A system of being screwed into the cylindrical member 119 may be applied to the cap member 161.

Figure 15:
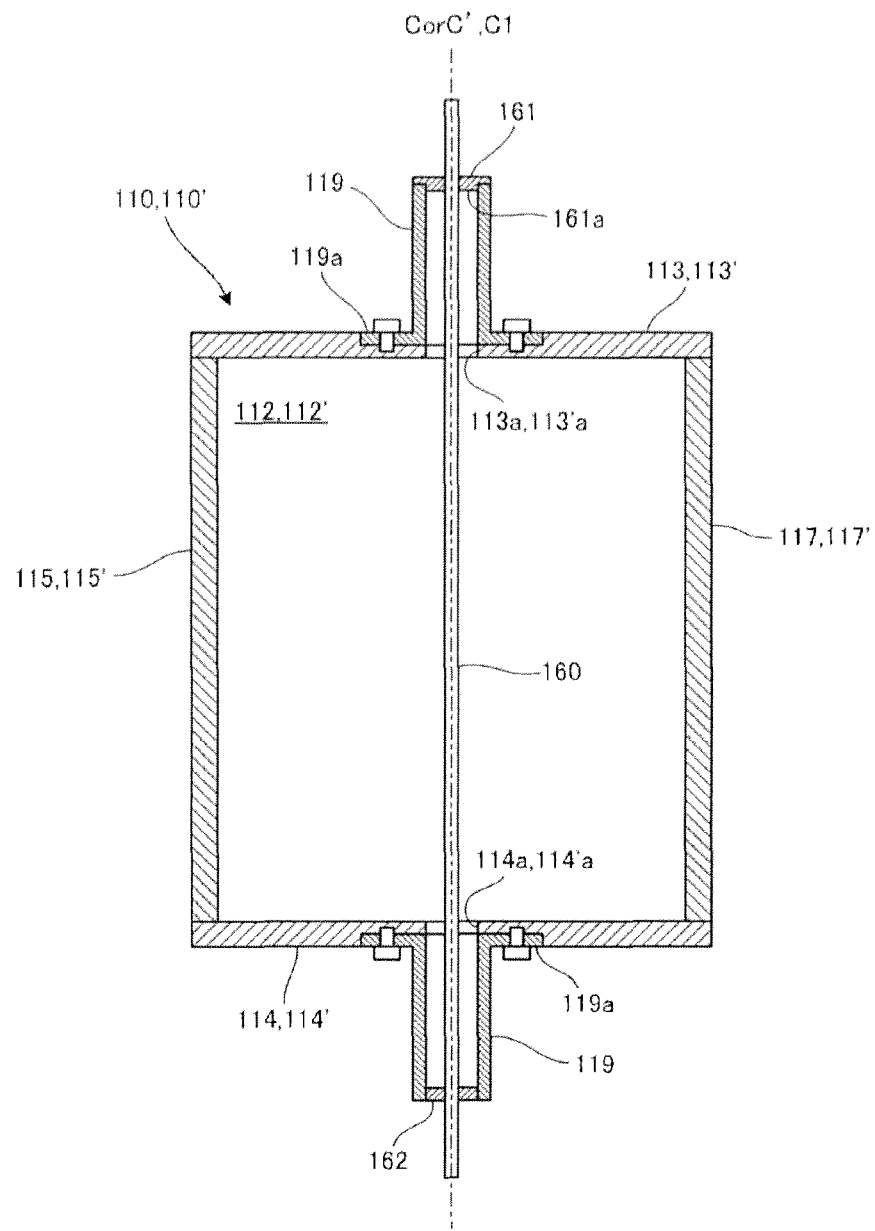
FIG. 15 illustrates a third embodiment of the flow tube.

The other end of the flow tube 160 to whose one end the cap member 161 is attached is made a tip (downward in FIG. 15) and is inserted into the irradiation chamber 112 or 112' by passing through the cylindrical member 119 of the bottom wall 113 or 113' positioned on upper side in FIG. 15. The inserted other end of the flow tube 160 passes through the irradiation chamber 112 or 112' to enter the cylindrical member 119 of the bottom wall 114 or 114' positioned on the opposite side. A position holding member 162 to allow the other end of the flow tube 160 to penetrate for positioning is fixed to a position on the tip side of the cylindrical member 119 by screwing. The position holding member 162 is in a disc shape, and has a through hole opened in the center thereof, in which the diameter of the through hole corresponds to the outside diameter of the flow tube 160. The flow tube 160 is positioned to approximately match the center axis C or C' and the axis line C1 by piercing the other end of the flow tube 160 through the through hole, and the other end of the flow tube 160 protrudes outward through the position holding member 162. Accordingly, the flow tube 160 is installed in the irradiation chamber 112 or 112', in which one end thereof is held by the cap member 161, the flow tube 160 passes through the cylindrical member 119 to hang down into the irradiation chamber 112 or 112' and the other end thereof passes through the cylindrical member 119 on the opposite side to protrude from the position holding member 162. Since the flow tube 160 is installed by using the cylindrical member 119 protruding outward like a chimney from the cavity resonator 110 or 110', leakage of microwaves from the irradiation chamber 112 or 112' to the outside is prevented.

By adopting a system in which the flow tube 160 to which the cap member 161 is attached is inserted through the cylindrical member 119 as described above, the flow tubes 160 having different diameters can be installed by replacement. That is, microwave treatment can be implemented by selecting and replacing the flow tube 160 having the appropriate diameter in accordance with the amount of treatment per unit time.

Figure 16:
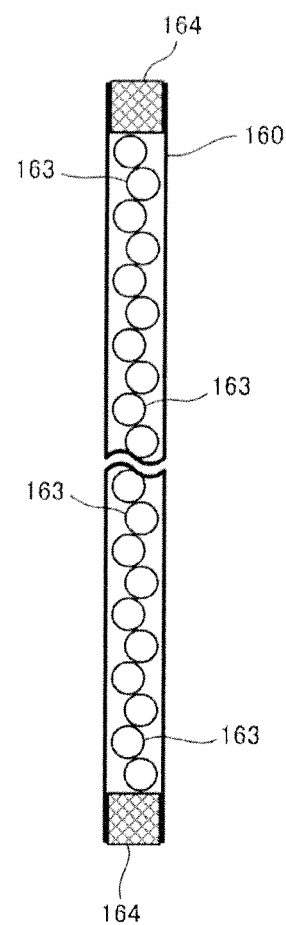
FIG. 16 is an enlarged view illustrating the flow tube according to the third embodiment.

The flow tube 160 to be installed in the irradiation chamber 112 or 112' contains, as shown in FIG. 16, an obstacle 163. The obstacle 163 is held inside the flow tube 160 by, for example, stuffing both ends (or only the lower end) of the flow tube 160 with a filter material 164 such as absorbent cotton and nonwoven cloth to cap the flow tube 160. The obstacle 163 shown in FIG. 16 is made from a plurality of granular objects (described as spheres, but other shapes than spheres may be adopted) 163 of the same material contained in the flow tube 160. The flow of a liquid to be treated flowing through the flow tube 160 is disturbed by the presence of the obstacle 163. That is, the obstacle 163 performs not only a function to reduce the volume of the liquid to be treated in the flow tube 160, but also the following important functions.

If there is nothing in the flow tube 160, the liquid to be treated flowing through the flow tube 160 becomes a laminar flow. However, if there is the obstacle 163 in the flow tube 160, a turbulent flow arises in the liquid to be treated flowing in the flow tube 160. By causing a turbulent flow by the obstacle 163, agitation of the liquid to be treated arises, and hence an accelerated chemical reaction of the liquid to be treated occurs.

The obstacle 163 is made from a material having a different dielectric constant from that of the liquid to be treated. The obstacle 163 in the present embodiment is made from a material whose dielectric constant is lower than that of the liquid to be treated and which absorbs less microwaves (or does not absorb microwaves) such as alumina (aluminum oxide), fluororesin, quartz, or borosilicate glass. In addition to the turbulent flow, because the dielectric constant of the obstacle 163 differs from that of the liquid to be treated, the distribution of the electric field is no longer uniform inside the flow tube 160 through which the liquid to be treated flows and also, on average, the strength of the electric field decreases.

More specifically, first, it is necessary to consider the following two points to accelerate a reaction of the liquid to be treated.

(1) It is necessary to consider providing appropriate activation energy to the liquid to be treated swiftly. However, too much activation energy partially provided leads to generation of by-products. Therefore, it is necessary to uniformly provide activation energy to the liquid to be treated in the irradiation chamber in a short time.

(2) It is necessary to consider increasing opportunities for mutual contact of materials reacting in the liquid to be treated. That is, if the liquid to be treated flows through the flow tube as a laminar flow, adequate acceleration of reaction is not achieved even if uniform heating is realized. Therefore, some contrivance to intentionally cause a turbulent flow of the liquid to be treated in the flow tube is needed.

Secondly, it is necessary to consider arranging the liquid to be treated in a portion where the electric field is strong inside the irradiation chamber to provide activation energy uniformly and swiftly. For example, arrangement of the flow tube along the center axis C or C' of the irradiation chamber is considered. In this case, however, a decrease in Q occurs for the liquid to be treated whose microwave absorption is good such as water and the resonance frequency significantly decreases and a risk of deviating from a predetermined band, for example, the ISM band arises.

For these three points of intentional generation of a turbulent flow, inhibition of Q decrease, and maintenance of the ISM band, the obstacle 163 functions appropriately. In addition, the obstacle 163 can be caused to hold a catalyst (solid catalyst) for a chemical reaction or the obstacle 163 can be used as a susceptor.

Figure 17A:
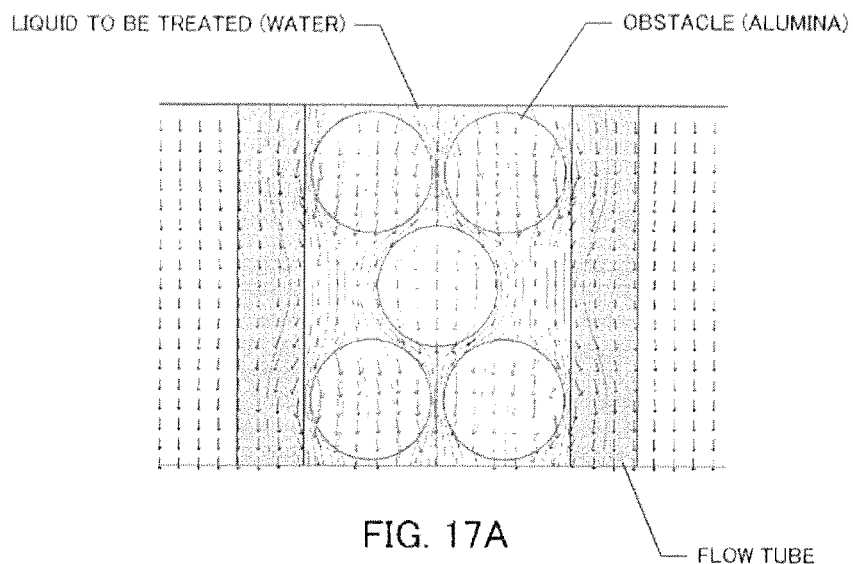
FIG. 17 illustrates electric field simulation results in the flow tube including an obstacle.
Figure 17B:
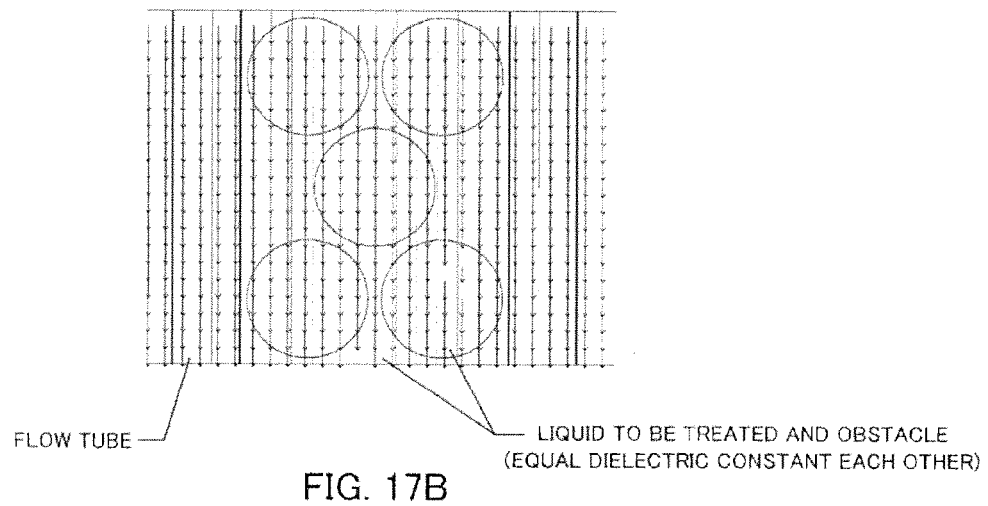

Regarding the above functions, FIG. 17 exemplifies an electric field simulation when water flows as a liquid to be treated into the quartz flow tube 160 containing the obstacle 163. FIG. 17A shows a result when the obstacle 163 is made from granular alumina and the relative dielectric constant thereof is lower than that of water. FIG. 17B shows a result when the relative dielectric constant of the obstacle 163 is the same as that of water. The relative dielectric constant of water is set to 80 and the relative dielectric constant of granular alumina is set to 10 for calculation. Water as the liquid to be treated having a large relative dielectric constant conspicuously induces a phenomenon in which the resonance frequency is decreased, has good microwave absorption, and has properties of decreasing Q. Therefore, according to conventional technology, it was necessary to limit the inside diameter of the flow tube to 1 mm or less.

With the presence of the obstacle 163 exercising the above functions, as shown in FIG. 17A, the electric field distribution inside the flow tube 160 is disturbed and is no longer uniform and particularly, the strength of the electric field in the water on average becomes weaker. Then, microwave absorption proportional to the square of the electric field decreases so that decrease in Q is inhibited. In FIG. 17B, in contrast, the electric field distribution does not change and remains strong, which causes the resonance frequency and Q to decrease. That is, by containing the obstacle 163 whose dielectric constant is different from that of the liquid to be treated in the flow tube 160 to disturb the flow, the decrease of the resonance frequency and the decrease in Q can be inhibited and it becomes easier to produce resonance in the ISM band, offering great advantages in designing a device.

FIG. 18A is a diagram of a result of an experiment performed by preparing the flow tubes 160 made of glass whose outside diameter is 3 mm and 4 mm (the inside diameter: 1.6 mm and 2.4 mm respectively), containing the obstacle 163 of granular alumina of diameters 0.5 mm and 1 mm therein, and putting the flow tubes 160 into cavity resonator 110 shown in FIG. 13 of TM110. The vertical axis denotes the microwave frequency inside the irradiation chamber 112 and Conditions 1 to 7 are allocated to the horizontal axis, Condition 1 is a condition under which there is nothing in the irradiation chamber 112, Condition 2 is a condition under which the vacant flow tube 160 is set to the irradiation chamber 112, Condition 3 is a condition under which the flow tube 160 containing the obstacle 163 having each grain diameter of 1 mm is set to the irradiation chamber 112 and no liquid to be treated (water) flows, Condition 4 is a condition under which the flow tube 160 containing the obstacle 163 having each grain diameter of 0.5 mm is set to the irradiation chamber 112 and no liquid to be treated (water) flows, Condition 5 is a condition under which the flow tube 160 containing the obstacle 163 having each grain diameter of 1 mm is set to the irradiation chamber 112 and the liquid to be treated (water) flows, Condition 6 is a condition under which the flow tube 160 containing the obstacle 163 having each grain diameter of 0.5 mm is set to the irradiation chamber 112 and the liquid to be treated (water) flows, and Condition 7 is a condition under which the vacant flow tube 160 containing no obstacle 163 is set to the irradiation chamber 112 and the liquid to be treated (water) flows. It is evident that while the frequency decreases to such an extent that the ISM band is sharply deviated under Condition 7, the decrease of frequency is mitigated to such an extent that the frequency can be controlled within the ISM band under Condition 5 and Condition 6. That is, it is possible to understand from FIG. 18A that the range of the frequency decrease under Condition 5 and Condition 6 is within 100 MHz with respect to the frequency under Condition 1 under which there is nothing in the irradiation chamber 112 so that the frequency can easily be controlled.

FIG. 18B shows a calculation example of Q of a flow tube without obstacle. In general, it becomes difficult to search for resonance if the value of Q is 100 or less. For water, for example, Q drops if the inside diameter of the flow tube exceeds 1.0 mm, making tuning control difficult. The decrease in Q is inhibited by containing the obstacle 163 so that the flow tube 160 can be made larger.

As a result of microwaves absorbed by the liquid to be treated being inhibited as described above, even if the flow rate of the liquid to be treated is increased by making the diameter of the flow tube 160 larger than in the conventional case, for example, 3 mm or 4 mm (the inside diameter is 1.5 mm or more), the decrease in Q is inhibited to make synchronization easier. That is, treatment efficiency can be improved by increasing the flow rate of the liquid to be treated.

Figure 19:
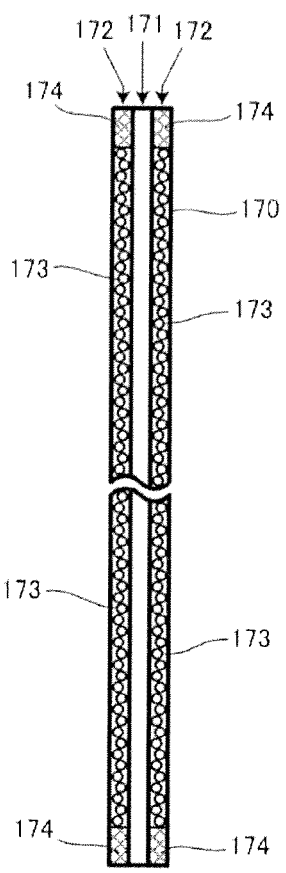
FIG. 19 is a diagram corresponding to FIG. 16 illustrating a fourth embodiment of the flow tube.

FIG. 19 shows the fourth embodiment of a flow tube. A flow tube 170 in the present embodiment is made of, as an example, quartz glass and has a double-tube structure including an inner channel 171 and an outer channel 172 surrounding the inner channel 171. The outer channel 172 surrounding the inner channel 171 contains, like the flow tube 160 in the third embodiment, obstacle 173 of many minor-diameter granular objects. The flow rate is inhibited by setting the inside diameter of the inner channel 171 to 1.5 mm or less to inhibit absorption of a microwave by a liquid flowing therethrough. The outer channel 172 contains the obstacle 173 having the above workings so that the flow rate of the liquid to be treated can be increased by making the diameter larger. Both ends of the outer channel 172 are stuffed with filter materials 174 such as absorbent cotton and nonwoven cloth to cap the outer channel 172. According to the fourth embodiment, a liquid other than the liquid to be treated, for example, a coolant such as fluorinert may flow through the inner channel 171.

Figure 20:
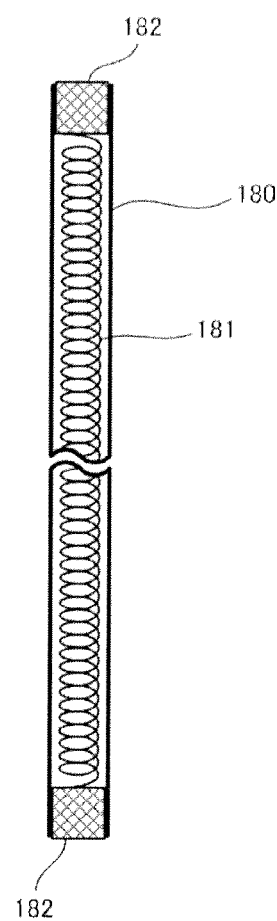
FIG. 20 is a diagram corresponding to FIG. 16 illustrating a fifth embodiment of the flow tube.

FIG. 20 shows a fifth embodiment of a flow tube. A flow tube 180 in the present embodiment is made of, as an example, quartz glass and is a straight tube whose inside diameter is, for example, 3 mm or more. The flow tube 180 contains a linear obstacle 181 made of a material similar to that of the flow tube 160 in the third embodiment and wound in a helical fashion. Both ends of the flow tube 180 are stuffed with filter materials 182 such as absorbent cotton and nonwoven cloth to cap the flow tube 180 so that the obstacle 181 should not fall through. Even the obstacle 181 in a helical fashion can cause a turbulent flow in the liquid to be treated flowing through the flow tube 180 so that the function similar to that of the flow tube 160 in the third embodiment can be exercised. Other than winding, the obstacle 181 may adopt other shapes to disturb the laminar flow such as braiding reticulately.

In addition, the flow tube may have a triple-tube structure and in this case, the innermost channel can be used as the channel 171 and the outermost channel can be used as the channel 172. An example in which an intermediate channel therebetween contains the obstacle in a helical fashion like in the fifth embodiment in FIG. 20 can be considered. If, in this example, the helical obstacle is sufficiently thick, the liquid to be treated can flow through the intermediate channel in a helical.

Figures 21A, 21B:
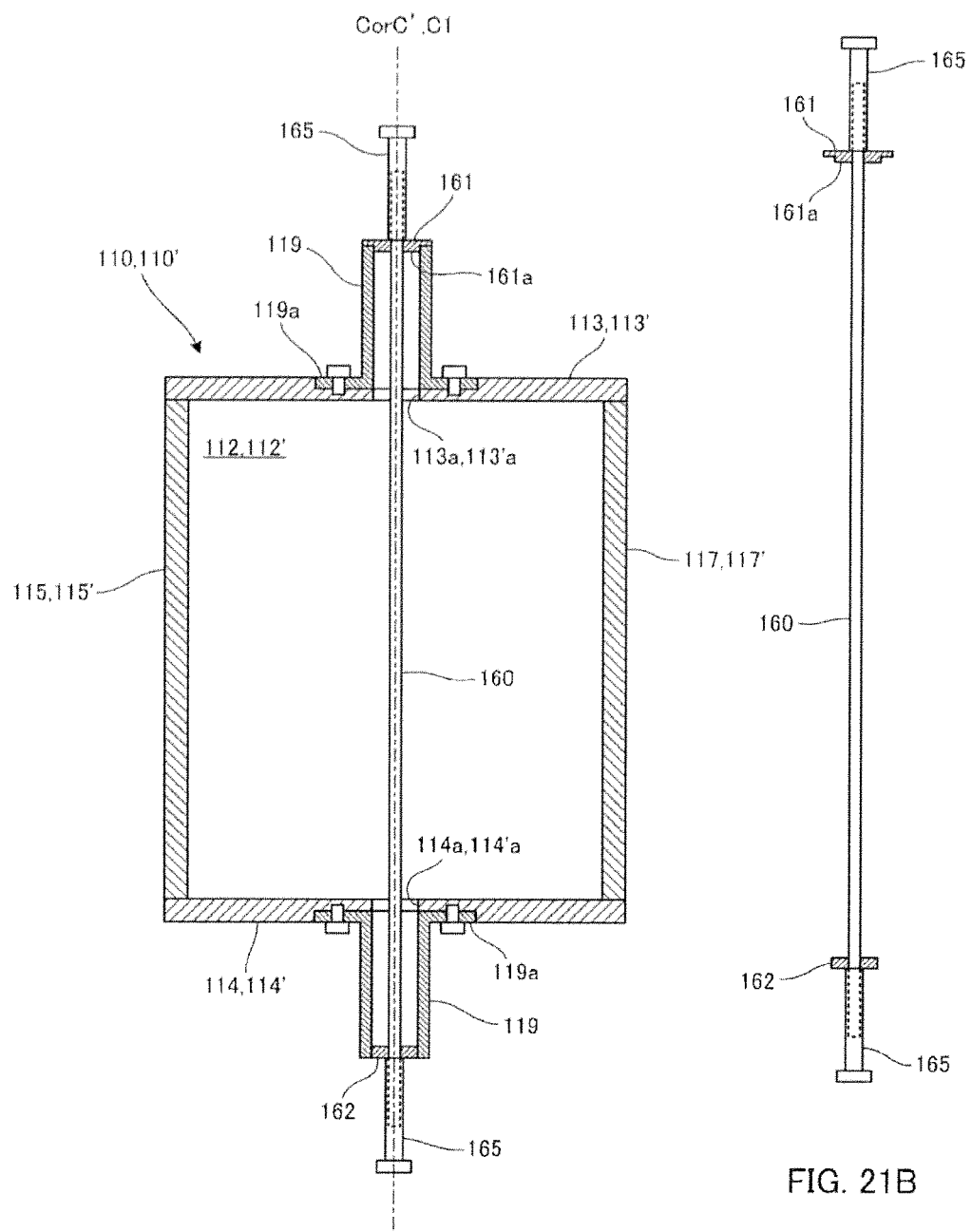
FIG. 21 illustrates a sixth embodiment of the flow tube.

FIG. 21 illustrates a sixth embodiment of a flow tube. The present embodiment is realized by attaching a heat-shrinkable tube 165 to both ends of the flow tube 160 in the third embodiment and a joint described later is attached to the tip of these heat-shrinkable tubes 165. As shown in FIG. 21B, the heat-shrinkable tube 165 is fixed to both ends of the flow tube in the sixth embodiment and thus, both of the cap member 161 and the position holding member 162 are attached to the flow tube 160 in advance and held by the heat-shrinkable tubes 165 so as not to fall through. The flow tube 160 is inserted into the irradiation chamber 112 or 112' through the upper cylindrical member 119 while the side of the position holding member 162 being held downward. Then, the heat-shrinkable tube 165 and the position holding member 162 on the tip side of the flow tube 160 dangling into the irradiation chamber 112 or 112' are inserted into the lower cylindrical member 119 and the heat-shrinkable tube 165 is set to protrude from the cylindrical member 119. The position holding member 162 remains inside the cylindrical member 119 and, like the flow tube 160 in the third embodiment, the tip-side position of the flow tube 160 is kept. That is, the state after the flow tube 160 is set is the same as in the third embodiment.

Figure 22:
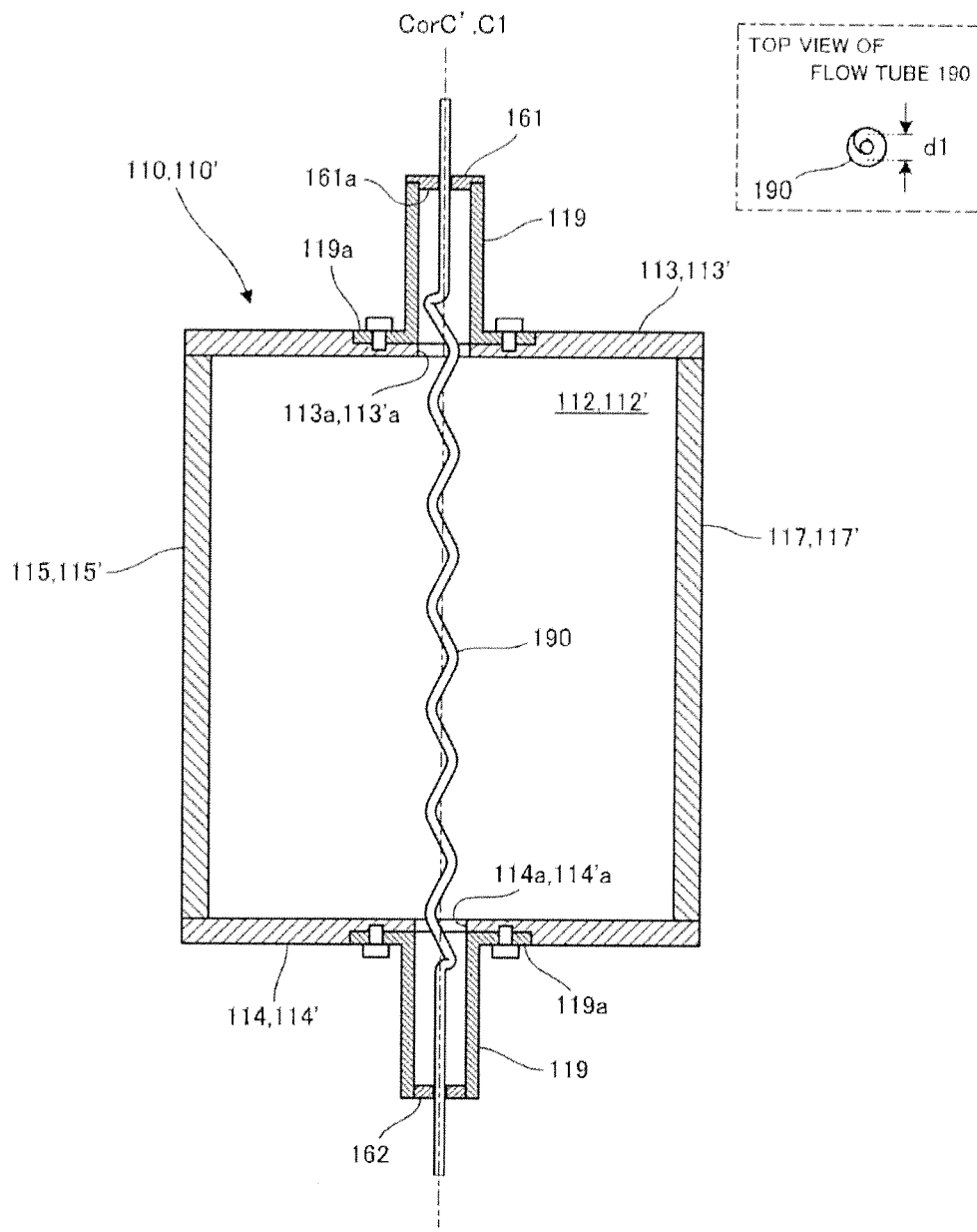
FIG. 22 illustrates a seventh embodiment of the flow tube.

FIG. 22 illustrates a seventh embodiment of a flow tube whose shape is modified. The material of a flow tube 190 in the present embodiment is, like the above embodiments, quartz, borosilicate glass and an intermediate portion other than straight line portions at both ends to pass through the cap member 161 and the position holding member 162 is formed as a helical tube. Like the flow tubes in the above embodiments, the flow tube 190 in a helical fashion is also arranged in such a way that the axis line C1 of the helical center approximately matches the center axis C or C' by using the cap member 161, the position holding member 162, and the cylindrical member 119.

A boundary region between the straight portion and the helical tube portion at both ends (a portion of starting the helical tube portion at both ends) in the flow tube 190 is formed in such a way that the boundary region is positioned inside the cylindrical member 119 when the flow tube 190 is installed in the irradiation chamber 112 or 112'. That is, the length of the helical tube portion is formed longer than the irradiation chamber 112 or 112' (length H) and is formed to a length so that the helical tube portion reaches into the cylindrical member 119. The helical flow tube 190 contains an obstacle similar to that of the above embodiments.

In the seventh embodiment, if the winding number (pitch) of helical of the flow tube 190 is increased, the treatment time increases with an increasing tube length and conversely, if the winding number is decreased, the treatment time decreases with a decreasing tube length. Therefore, microwave treatment can be performed by selecting and replacing the flow tube 190 of the appropriate winding number and thickness in accordance with the liquid to be treated. For a helical flow tube, the flow in the direction of crossing the electric field direction in the irradiation chamber is added regarding the direction in which the liquid to be treated flows and so no obstacle may be contained (see the flow tubes in the first and second embodiments).

Like the flow tubes in the first and second embodiments, the helical winding diameter d1 of the flow tube 190 according to the seventh embodiment is set as described below.

In the cavity resonator 110 according to the third embodiment, the transverse plane of the irradiation chamber 112 is approximately square and thus, an electric field changes depending on the location in a circumferential direction rotating around the center axis C. That is, the electric field changes along the direction of the flow of the flow tube 190. The simulation in this state is as shown in FIG. 8. As described above regarding FIG. 8, the electric field along the flow tube 190 represents a major change with an increase of d1 with respect to L of the irradiation chamber 112, that is, with an increase in distance (d1/2) from the center axis C to the center of the inner diameter of the flow tube 190. Therefore, in consideration of uniformity of treatment, it is better to reduce d1 to a size in which the change in the electric field has an insignificant effect. In consideration of simulation results, the electric field can be regarded approximately constant if d1/L is equal to or less than 0.5, and thus, it is preferable to set d1 to 50% or less of one side L of the approximate square forming the bottom face of the irradiation chamber 112, that is, d1/2, which is the distance from the center axis C to the center of the inside diameter of the flow tube 190 to 25% or less thereof.

Figure 23:
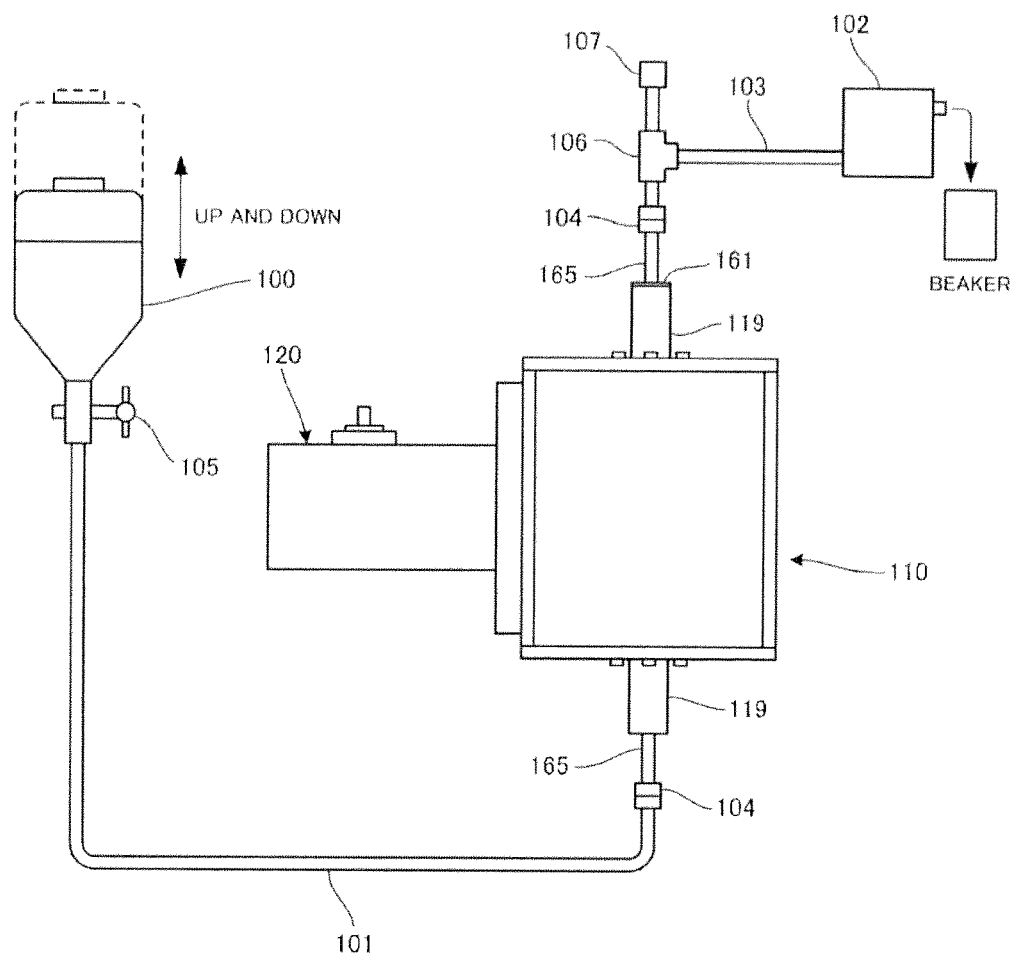
FIG. 23 illustrates a second example of the flow mechanism flowing the liquid to be treated through the flow tube.

A second example of the flow mechanism for flowing the liquid to be treated into the flow tube 160, 170, 180 or 190 in the third to seventh embodiments is shown in FIG. 23. However, the present embodiment is not limited to the shown example and a flow mechanism in which a liquid sending system is configured by a liquid sending pump may also be used.

The cavity resonator 110 according to the third embodiment is installed and one of the flow tubes 160, 170, 180, 190 according to the above embodiments is accommodated in the irradiation chamber 112 by using the cylindrical member 119. The heat-shrinkable tube 165 shown in the sixth embodiment (FIG. 21) is attached to both ends of the flow tube 160, 170, 180 or 190 pulled out of the cylindrical member 119. The lower side of the heat-shrinkable tube 165 at both ends is connected to a liquid sending tube 101 of a container 100 storing a liquid to be treated before treatment and the upper side of the heat-shrinkable tube 165 is connected to a liquid sending tube 103 of a container 102 storing a treated liquid (after treatment) via the joint 104 in both cases.

The container 100 before treatment includes a flow rate control cock 105 in a bung hole and a vertical position thereof can be adjusted. A treated liquid flows into the container 102 after treatment from a lower end position and when the stored liquid is reached to the bung hole in an upper position, the treated liquid is discharged into a beaker. The flow mechanism is a mechanism for flowing the liquid to be treated upward from a lower portion of the flow tube 160, 170, 180 or 190 inside the irradiation chamber 112 and the flow of the liquid to be treated is controlled by adjusting the height of the container 100 and the flow rate control cock 105. The treated liquid can be accumulated up to the height of the liquid level of the container 100 before treatment in the container 102.

The liquid sending tube 103 connected to the container 102 after treatment is connected to the joint 104 via a T-joint 106. The T-joint 106 includes one inflow port connected to the joint 104 and two outflow ports. One of the two outflow ports is connected to the liquid sending tube 103. The other outflow port of the T-joint 106 is plugged by a temperature measuring instrument 107 with a thermocouple, etc. The temperature measuring instrument 107 measures the temperature of the treated liquid by microwave treatment and provides measurement results to the control unit 140 in FIG. 12.

REFERENCE SIGNS LIST 10, 10' Cavity resonator
11, 11' Iris
12, 12' Irradiation chamber
20 Waveguide
60 Flow tube
61, 61' Support rod
C, C' Center axis
110, 110' Cavity resonator
112, 112' Irradiation chamber
119 Cylindrical member
119a Flange
160, 170, 180, 190 Flow tube 161 Cap member
161a Swelling portion
162 Position holding member
163, 173, 181 Obstacle
164, 174, 182 Filter body
171 Inner channel
172 Outer channel
C1 Axis line

The invention claimed is:

1. A microwave device, comprising:
a microwave generator configured to generate a microwave and output the microwave;
a waveguide configured to guide the microwave output from the microwave generator;
a cavity resonator having an irradiation chamber which is a quadrangular prism cavity,
the microwave generator and the cavity resonator being configured to:
introduce the microwave guided by the waveguide into the quadrangular prism cavity,
excite an electric field by resonating the microwave in the irradiation chamber, and
generate the electric field in TM110 mode along a direction of a center axis through centers of top and bottom faces of the irradiation chamber, such that the center axis is a location where the electric field is the strongest in the irradiation chamber;
and
a flow tube installed in the irradiation chamber, formed in a helical fashion by winding and extending around the center axis, and configured to cause a liquid to be treated to flow in a direction crossing the electric field generated in the irradiation chamber.

2. The microwave device according to claim 1, wherein the irradiation chamber of the cavity resonator is a regular quadrangular prism cavity whose bottom face is approximately square and whose side face is rectangular, and
a winding diameter d1 of the flow tube is equal to or less than 50% of one side L of the bottom face of the regular quadrangular prism cavity.

3. A microwave device, comprising:
a microwave generator configured to generate a microwave and output the microwave;
a waveguide configured to guide the microwave output from the microwave generator;
a cavity resonator having an irradiation chamber which is a cylindrical cavity,
the microwave generator and the cavity resonator being configured to:
introduce the microwave guided by the waveguide into the cylindrical cavity,
excite an electric field by resonating the microwave in the irradiation chamber, and
generate the electric field in TM010 mode along a direction of a center axis through centers of top and bottom faces of the irradiation chamber, such that the center axis is a location where the electric field is the strongest in the irradiation chamber; and
a flow tube installed in the irradiation chamber, formed in a helical fashion by winding and extending around the center axis, and configured to cause a liquid to be treated to flow in a direction crossing the electric field generated in the irradiation chamber,
wherein a winding diameter d1 of the flow tube is equal to or less than 50% of a diameter of the bottom face of the cylindrical cavity.

* * * * *